(12) United States Patent  
Nagata et al.

(10) Patent No.: US 10,697,801 B2  
(45) Date of Patent: Jun. 30, 2020

(54) ROTATIONAL ANGLE DETECTION APPARATUS AND ROTATING MACHINE APPARATUS

(71) Applicant: TDK Corporation, Tokyo (JP)

(72) Inventors: Masaki Nagata, Tokyo (JP); Kazuya Watanabe, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 365 days.

(21) Appl. No.: 15/450,273

(22) Filed: Mar. 6, 2017

(65) Prior Publication Data

US 2017/0261349 A1 Sep. 14, 2017

(30) Foreign Application Priority Data

Mar. 11, 2016 (JP) .................................. 2016-48622

(51) Int. Cl.
- *G01D 5/20* (2006.01)
- *G01D 5/14* (2006.01)
- *G01D 5/16* (2006.01)

(52) U.S. Cl.
CPC ........... *G01D 5/2033* (2013.01); *G01D 5/145* (2013.01); *G01D 5/16* (2013.01)

(58) Field of Classification Search
CPC ......... G01D 5/2033; G01D 5/145; G01D 5/16

(Continued)

(56) References Cited

U.S. PATENT DOCUMENTS

| | | | | |
|---|---|---|---|---|
| 6,064,197 A | * | 5/2000 | Lochmann | ............... G01B 7/30 |
| | | | | 324/207.14 |
| 6,396,259 B1 | * | 5/2002 | Washeleski | ........... F02D 11/106 |
| | | | | 324/207.12 |

(Continued)

FOREIGN PATENT DOCUMENTS

| | | | | |
|---|---|---|---|---|
| DE | 102017104512 A1 | * | 9/2017 | ............. G01D 5/145 |
| DE | 102017105148 A1 | * | 9/2017 | ............. G01D 5/145 |

(Continued)

*Primary Examiner* — Patrick Assouad  
*Assistant Examiner* — Sean Curtis  
(74) *Attorney, Agent, or Firm* — Posz Law Group, PLC

(57) ABSTRACT

A rotational angle detection apparatus is provided with a magnet disposed so as to be rotatable integrally with an axis of rotation, having a substantially circular shape when viewed along the axis of rotation, and including a magnetization vector component in a direction orthogonal to the axis of rotation; a magnetic sensor that outputs a sensor signal on the basis of change in a magnetic field accompanying rotation of the magnet; and a rotational angle detector that detects a rotational angle of the rotating body on the basis of the sensor signal output by the magnetic sensor; wherein the magnet has a curved inclined surface with a concave shape along the axis of rotation from a prescribed position on the outer side in a radial direction toward the axis of rotation, and when a circular virtual plane orthogonal to the axis of rotation and centered at the axis of rotation is established at a position opposed to the curved inclined surface, the magnetic sensor is disposed at a position at which the amplitudes of a magnetic field intensity $H_r$ in a radial direction and a magnetic field intensity $H_\theta$ in a circumferential direction on the virtual plane are substantially the same, and the magnetic field intensities $H_r$ and $H_\theta$ in the radial direction and/or the circumferential direction is output as the sensor signal.

12 Claims, 20 Drawing Sheets

(58) Field of Classification Search
USPC .......................................... 324/200–207.26
See application file for complete search history.

(56) References Cited

U.S. PATENT DOCUMENTS

| | | | | |
|---|---|---|---|---|
| 6,584,838 B2* | 7/2003 | Lorenzen | ................ | G01F 23/38 |
| | | | | 73/290 R |
| 6,734,667 B2* | 5/2004 | Lorenzen | ................ | G01F 23/38 |
| | | | | 324/207.2 |
| 7,268,540 B1* | 9/2007 | Kitanaka | ................ | G01D 5/145 |
| | | | | 324/207.25 |
| 8,030,917 B2* | 10/2011 | Hatanaka | ............... | G01D 5/145 |
| | | | | 324/207.11 |
| 9,389,099 B2* | 7/2016 | Deak | .................... | G01D 5/2497 |
| 10,288,451 B2* | 5/2019 | Nagata | ................... | G01D 5/145 |
| 2002/0178810 A1* | 12/2002 | Lorenzen | ................ | G01F 23/38 |
| | | | | 73/313 |
| 2003/0052669 A1* | 3/2003 | Enomoto | ............... | G01D 5/145 |
| | | | | 324/207.25 |
| 2003/0177827 A1* | 9/2003 | Lorenzen | ................ | G01F 23/38 |
| | | | | 73/313 |
| 2005/0012500 A1* | 1/2005 | Braun | .................... | G01D 5/145 |
| | | | | 324/207.24 |
| 2011/0080163 A1* | 4/2011 | Hariu | ...................... | G01B 7/30 |
| | | | | 324/207.25 |
| 2015/0369636 A1* | 12/2015 | Deak | .................... | G01D 5/2497 |
| | | | | 324/207.21 |
| 2016/0216132 A1* | 7/2016 | Ausserlechner | ......... | G01D 5/14 |
| 2017/0261342 A1* | 9/2017 | Nagata | ................... | G01D 5/165 |
| 2017/0261346 A1* | 9/2017 | Hirota | ..................... | G01D 5/16 |
| 2017/0261347 A1* | 9/2017 | Nagata | ................... | G01D 5/145 |
| 2017/0261349 A1* | 9/2017 | Nagata | ................... | G01D 5/16 |
| 2017/0356764 A1* | 12/2017 | Deak | ..................... | G01R 33/09 |
| 2019/0154464 A1* | 5/2019 | Ausserlechner | ......... | G01D 5/14 |

FOREIGN PATENT DOCUMENTS

| | | |
|---|---|---|
| JP | 2003-075108 A | 3/2003 |
| WO | 2008/050581 A1 | 5/2008 |

* cited by examiner

ROTATIONAL ANGLE DETECTION APPARATUS AND ROTATING MACHINE APPARATUS

CROSS REFERENCE TO RELATED APPLICATIONS

The present application is based on Japanese Patent Application No. 2016-48622 filed on Mar. 11, 2016, the disclosure of which is incorporated herein by reference.

TECHNICAL FIELD

The present invention relates to a rotational angle detection apparatus for detecting a rotational angle of a rotating body, and a rotating machine apparatus including such.

BACKGROUND

Conventionally, a rotational angle detection apparatus for detecting the rotational angle of a rotating body has been used in a variety of applications. As this kind of rotational angle detection apparatus, an apparatus has been known that is provided with a magnet fixed so as to rotate integrally with the rotating body, and a magnetic sensor element for detecting changes in the intensity of a magnetic field accompanying rotation of the magnet. In such a rotational angle detection apparatus, the magnetic sensor element outputs a signal indicating the relative positional relationship between the rotating body and the magnetic sensor element.

As a conventional rotational angle detection apparatus, as shown in FIG. 37A and FIG. 37B, an apparatus has been known in which a magnet 200 formed in a disk shape is supported by and fixed to a shaft S (axis of rotation) such that a first surface 201 and a second surface 202 of the magnet 200 are orthogonal to the shaft S (axis of rotation), and magnetic sensor elements (Hall elements) 300 are positioned directly below the outer perimeter of the second surface 202 of the magnet 200 and in a circumferential direction centered on the shaft S (axis of rotation), (see Patent Literature 1).

In the above-described rotational angle detection apparatus, there are cases in which the magnet 200 supported by and fixed to the shaft S (axis of rotation) moves slightly in a radial direction, due to axial shaking occurring in which the shaft S (axis of rotation) moves slightly in a radial direction. On the other hand, the magnetic sensor element (Hall element) 300 is positioned to measure the magnetic flux density in a direction parallel to the shaft S (axis of rotation), at the corner of the outer perimeter of the magnet 200. Consequently, the problem exists that accompanying slight movements of the magnet 200, the measured value of the magnetic flux density measured by the magnetic sensor element (Hall element) 300 fluctuates greatly, and the measurement error in the angle of rotation becomes large.

Hence, conventionally, as shown in FIG. 38A and FIG. 38B, a rotational angle detection apparatus has been proposed in which a magnet 210 is supported by and fixed to the shaft S (axis of rotation) and includes a first surface 211 and a second surface 212 which is opposed to the first surface 211 and a magnetic sensor element (Hall element) 310 is positioned directly below the outer perimeter edge of the magnet 210. The magnet 210 includes a chamfer 213 (inclined surface) formed by removing a corner of the outer perimeter edge of the first surface 211 side over the entire perimeter. The magnet 210 is arranged such that a portion of the detection surface of the magnetic sensor element (Hall element) 310 is positioned directly below the chamfer 213 (inclined surface), and the remaining portion is positioned to the outside of the outer perimeter edge of the magnet 210 (see Patent Literature 2).

PRIOR ART

Patent Literature

[PATENT LITERATURE 1] JP Laid-Open Patent Application No. 2003-75108
[PATENT LITERATURE 2] International Patent Application Publication 2008/050581

SUMMARY

Problem to be Solved by the Invention

However, in the rotational angle detection apparatus disclosed in the aforementioned Patent Literature 2, the optimal placement location of the magnetic sensor element 310 in order to reduce the rotational angle detection error varies depending on the angle of inclination of the chamfer 213 (inclined surface) of the magnet 210. Consequently, the problem exists that the placement location of the magnetic sensor element 310 must be finely adjusted in accordance with the angle of inclination of the chamfer 213 (inclined surface) of the magnet 210.

In addition, in general, reducing the volume of the magnet is required in order to reduce the size of the rotational angle detection apparatus, but on the other hand, the magnet is required to emit a magnetic field strong enough so that changes in magnetic flux density are measurable by the magnetic sensor element. In the aforementioned Patent Literature 2, because the chamfer 213 (inclined surface) is formed in the outer perimeter edge of the magnet 210, the volume can be reduced in comparison to a magnet in which the chamfer 213 (inclined surface) is not formed, but the magnetic field emitted toward the chamfer 213 (inclined surface) side from the magnet 210 (the magnetic field in the direction of the axis of rotation) becomes weaker. However, the magnet 210 must emit a magnetic field strong enough so that changes in the magnetic flux density are measurable by the magnetic sensor element 310, and simultaneously, conflicting requirements, namely the requirement to strengthen the magnetic field intensity and the requirement to reduce the volume of the magnet, must be satisfied, and this becomes difficult. If the volume of the magnet 210 is increased with the objective of strengthening the magnetic field intensity and through this the mass of the magnet 210 becomes relatively larger, the moment of inertia accompanying rotation of the shaft S (axis of rotation) becomes larger. As a result, controlling shaft shaking becomes difficult, and there are concerns that rotational angle detection errors could become larger. Furthermore, because it is necessary to secure the mass of the magnet 210 to a certain degree, the problem also exists that manufacturing costs for the rotational angle detection apparatus increase.

In the rotational angle detection apparatus disclosed in the aforementioned Patent Literature 2, the angle of rotation is calculated using the magnitude of the magnetic field emitted toward the chamfer (inclined surface) 210 side of the magnet 210 (the magnetic field in the direction of the axis of rotation C). Furthermore, when the magnetic sensor element 310 is positioned in an extremely narrow region opposed to the chamfer 213 (inclined surface) of the magnet 210, the rotational angle detection error becomes smaller. Moreover, the relative position of that region with respect to the magnet 210 fluctuates in accordance with the angle of inclination of the chamfer 213 (inclined surface). Consequently, in order to precisely detect the angle of rotation with the rotational angle detection apparatus disclosed in Patent Literature 2, the magnetic sensor element 310 must be precisely positioned in the above-described region that fluctuates in accordance with the angle of inclination of the chamfer 213 (inclined surface). Hence, the problem exists that rotational angle detection errors resulting from shaft shaking become larger.

In consideration of the foregoing, it is an object of the present invention to provide a rotational angle detection apparatus capable of precisely detecting the angle of rotation on the basis of the magnetic field intensity in a radial direction and/or a circumferential direction, and a rotating machine apparatus including such.

Means for Solving the Problem

In order to resolve the above-described problem, the present invention provides a rotational angle detection apparatus comprising: a magnet disposed to be rotatable integrally with an axis of rotation accompanying rotation of a rotating body having a substantially circular shape, when viewed along the axis of rotation, and including a magnetization vector component in a direction orthogonal to the axis of rotation; a magnetic sensor that outputs a sensor signal on the basis of change in a magnetic field accompanying rotation of the magnet; and a rotational angle detector that detects a rotational angle of the rotating body on the basis of the sensor signal output by the magnetic sensor; wherein the magnet has a curved inclined surface sloping while substantially curving in a concave shape along the axis of rotation from a prescribed position on the outer side in a radial direction of the magnet toward the axis of rotation; and when a circular virtual plane passing through a position opposed to the curved inclined surface, orthogonal to the axis of rotation and centered at the axis of rotation is established, the magnetic sensor is disposed at a position opposed to the curved inclined surface and at a position at which the amplitudes of a magnetic field intensity $H_r$ in a radial direction and a magnetic field intensity $H_\theta$ in a circumferential direction on the virtual plane are substantially the same. At least one of the magnetic field intensity $H_r$ in the radial direction and the magnetic field intensity $H_\theta$ in the circumferential direction is output as the sensor signal (Invention 1).

In the above-described invention (Invention 1), preferably the curved inclined surface contains first through Nth curved sections (where N is an integer 1 or greater) that respectively have successive differential values and curve in a concave shape; and in a cross section of the magnet along an axial direction of the axis of rotation, at least one maximum distance out of a maximum distance L from a line segment joining one end of an outermost position in the radial direction of a curve corresponding to the curved inclined surface and another end at an innermost position in a radial direction to a curve corresponding to the curved inclined surface in a direction orthogonal to the line segment. The maximum of distances $L_1$~$L_N$, from line segments joining one end at an outermost position in a radial direction of curves corresponding respectively to first through Nth curves and another end at an innermost position in the radial direction to curves corresponding to each of the curved section in a direction orthogonal to the line segment, is 0.5~4 mm (Invention 2).

In the above-described invention (Invention 1), preferably the magnet has a first magnet section that contains a first surface having a substantially circular shape when viewed along the axial direction of the axis of rotation wherein the curved inclined surface connects to an outer edge of the first surface and that is positioned on one side of the axis of rotation, and a second magnet section that is positioned on the other side of the axis of rotation and that is integrated with the first magnet section; and the diameter of the first magnet section increases from the first surface side toward the second magnet section side (Invention 3).

In the above-described invention (Invention 3), the second magnet section preferably contains a second surface that is opposed to the first surface of the first magnet section and that has a substantially circular shape when viewed along the axial direction of the axis of rotation (Invention 4), and preferably has a convex section protruding from the second surface along the axial direction of the axis of rotation (Invention 5).

In the above-described invention (Invention 5), the convex section preferably protrudes more inward in a radial direction of the magnet than an outermost edge in the radial direction of the magnet (Invention 6), and preferably protrudes so as to slope inward in a radial direction of the magnet (Invention 7).

In the above-described invention (Invention 1), it is possible to use an element containing a TMR element, a GMR element or an AMR element as the magnetic sensor (Invention 8).

In the above-described invention (Invention 1), preferably a plurality of the magnetic sensors are comprised, wherein at least two of the plurality of magnetic sensors are positioned along the circumferential direction on the virtual plane, substantially spaced at $(180/M)°$ (where M is an integer 2 or larger) centering on the axis of rotation (Invention 9).

In the above-described invention (Invention 9), preferably each of the magnetic sensors outputs the magnetic field intensity $H_r$ in the radial direction or the magnetic field intensity $H_\theta$ in the circumferential direction as the sensor signal (Invention 10).

In addition, the present invention provides a rotating machine apparatus comprising: the rotational angle detection apparatus according to the above-described invention (Invention 1), a shaft coupling that connects a first shaft and a second shaft connected to the rotating body so as to be able to integrally rotate, and a bearing that supports one end of the second shaft; wherein the magnet is positioned between the shaft coupling and the bearing, and is supported by and fixed to the second shaft while being penetrated by the second shaft; and at least one out of the second shaft, the shaft coupling and the bearing is composed of magnetic materials (Invention 11).

Efficacy of the Invention

With the present invention, it is possible to provide a rotational angle detection apparatus capable of precisely detecting the angle of rotation on the basis of the magnetic field intensity in a radial direction and/or a circumferential direction, and a rotating machine apparatus including such.

DETAILED DESCRIPTION

Figure 1A:
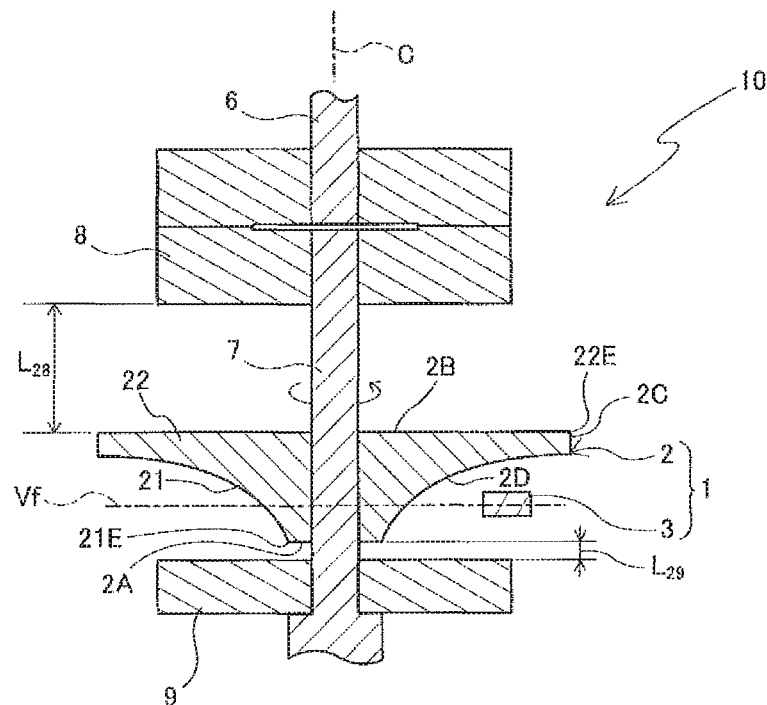
FIG. 1A is a cross sectional view showing a schematic configuration of a rotational angle detection apparatus according to an exemplary embodiment of the present invention.

The exemplary embodiment of the present invention will be described in detail with reference to the drawings. FIG. 1A is a cross sectional view showing a schematic configuration of a rotational angle detection apparatus according to the exemplary embodiment and a rotating machine apparatus including such, FIG. 1B is a plan view viewed from a first surface side of a magnet in the rotational angle detection apparatus according to the exemplary embodiment of the present invention, and FIG. 2 is a partial enlarged side view showing a main part of the magnet in the exemplary embodiment.

Figure 1B:
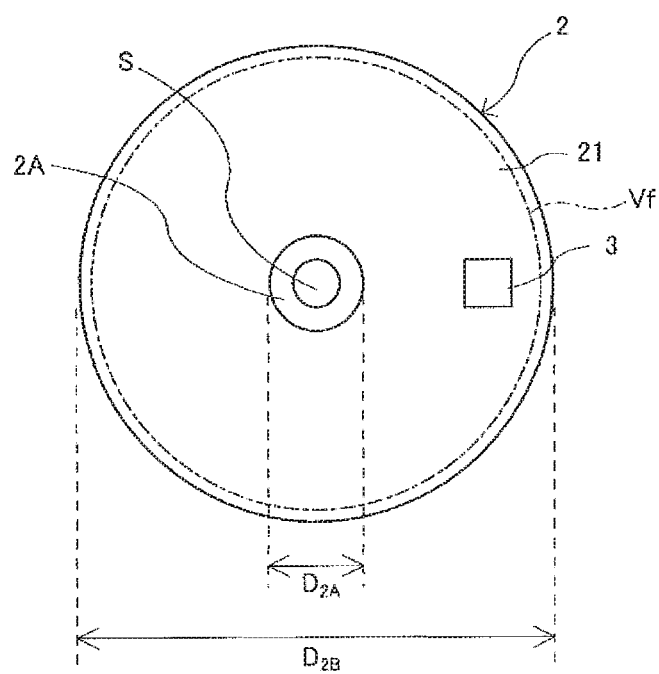
FIG. 1B is a plan view viewed from a second surface side of a magnet in the rotational angle detection apparatus according to the exemplary embodiment of the present invention.
Figure 2:
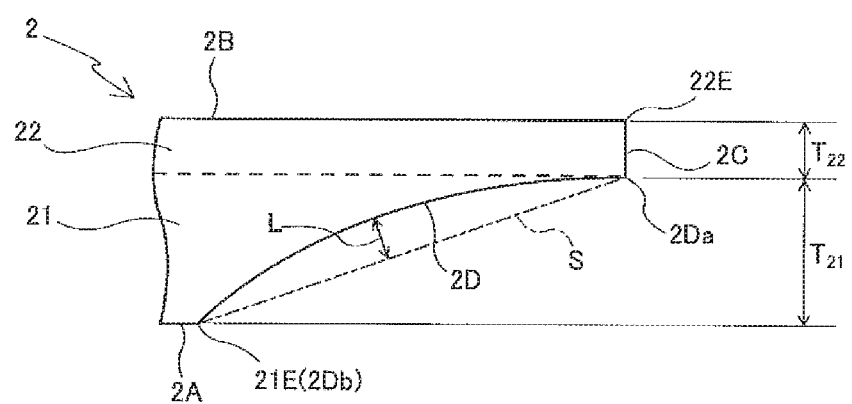
FIG. 2 is a partial enlarged side view showing a main part of the magnet in the exemplary embodiment of the present invention.

As shown in FIG. 1A and FIG. 1B, a rotating machine apparatus 10 according to the exemplary embodiment is provided with a first shaft 6 that rotates integrally with a rotational angle detection target (unrepresented) such as a motor, a gear or the like, a second shaft 7 whose axis of rotation C coincides with the first shaft 6 and is continuous in an axial direction, a shaft coupling 8 that supports and fixes the first shaft 6 and the second shaft 7, a bearing 9 that holds the second shaft 7, and a rotational angle detection apparatus 1 according to this exemplary embodiment.

The first shaft 6 and the second shaft 7 are composed of a magnetic metal such as Fe, Ni or the like, for example, and have a columnar shape. The shaft coupling 8 is composed of a magnetic metal such as Fe, Ni or the like, for example, and supports and fixes the first shaft 6 and the second shaft 7 so that such can rotate integrally. The bearing 9 is composed of a magnetic metal such as Fe, Ni or the like, for example. The first shaft 6, the second shaft 7, the shaft coupling 8 and the bearing 9, for example, can be composed of a carbon steel for structural use such as S45C, and a cold-rolled steel such as SPCC, or the like. The rotational angle detection apparatus 1 according to this exemplary embodiment can precisely detect the angle of rotation because an element (at least one of the second shaft 7, the shaft coupling 8 and the bearing 9) positioned at the perimeter of the magnet 2 is composed of a magnetic material such as a magnetic metal or the like.

The rotational angle detection apparatus 1 according to this exemplary embodiment is provided with a magnet 2 that is supported by and fixed to the second shaft 7 and rotates integrally with the second shaft 7, a magnetic sensor 3 that outputs a sensor signal on the basis of changes in direction of a magnetic field accompanying rotation of the magnet 2, and a rotational angle detector 4 (see FIG. 18) that detects the angle of rotation of the rotating body, on the basis of the sensor signal output by the magnetic sensor 3.

The magnet 2 includes a first surface 2A substantially orthogonal to the axis of rotation C (shaft center) of the second shaft 7, and a second surface 2B opposed to the first surface 2A. When viewed along the axial direction of the axis of rotation C of the second shaft 7, the first surface 2A and the second surface 2B have a roughly circular shape, and the second surface 2B has a size physically encompassing the first surface 2A.

The magnet 2 is supported by and fixed to the second shaft 7 so that the centers of gravity (centers) of the first surface 1A and the second surface 2B of the magnet 2 coincide with the axis of rotation C of the first shaft 6 and the second shaft 7 and is magnetized in a direction orthogonal to the axis of rotation C (an in-surface direction of the first surface 2A and the second surface 2B). In this exemplary embodiment, the magnet 2 magnetized in a direction orthogonal to the axis of rotation C is cited as an example, but this is not limited to such a state. For example, the magnet 2 may include a magnetization vector component in a direction orthogonal to the axis of rotation C, but it is preferable that the magnetization direction of the magnet 2 is substantially orthogonal (the angle of the magnetization direction with respect to the axis of rotation C is around 90±10°) to the axis of rotation C.

The magnet 2 in this exemplary embodiment contains a first magnet section 21 positioned on one side (the bearing 9 side) of the second shaft 7 in the axial direction, and a second magnet section 22 integral to the first magnet section 21 and positioned on the other side of the second shaft 7 in the axial direction. The first magnet section 21 contains a first surface 2A and a curved inclined surface 2D connected with an outer perimeter edge 21E of the first surface 2A and substantially curves in a concave shape. The second magnet section 22 contains a second surface 2B and a side surface 2C connected with an outer perimeter edge 22E of the second surface 2B and the second curved inclined surface 2D and substantially parallel to the axis of rotation C of the second shaft 7.

A thickness $T_{21}$ of the first magnet section 21 is not particularly limited and, for example, may be set at around 1~10 mm. A thickness $T_{22}$ of the second magnet section 22 is similarly not particularly limited and, for example, may be set to around 0~10 mm.

A ratio between a diameter $D_{2A}$ of the first surface 2A and a diameter $D_{2B}$ of the second surface 2B of the magnet 2 is preferably 1:4 or less. When the ratio between the diameter $D_{2A}$ of the first surface 2A and the diameter $D_{2B}$ of the second surface 2B exceeds 1:4, when a circular virtual plane Vf centered at the axis of rotation C, orthogonal to the axis of rotation C and passing through a region below the curved inclined surface 2D is established, the difference between the amplitudes of a magnetic field $H_r$ in a radial direction and a magnetic field $H_\theta$ in a circumferential direction at a prescribed position on the virtual plane Vf becomes large, creating the concern that angular errors could worsen. On the other hand, if the ratio between the diameter $D_{2A}$ of the first surface 2A and the diameter $D_{2B}$ of the second surface 2B is within the above range, when the virtual plane Vf centered at the axis of rotation C, orthogonal to the axis of rotation C and passing through a region below the curved inclined surface 2D is established, the amplitudes of the magnetic field $H_r$ in the radial direction and the magnetic field $H_\theta$ in the circumferential direction at a prescribed position on the virtual plane Vf can be made substantially the same. Here, the virtual plane Vf is a plane arbitrarily established to pass through a prescribed space below the curved inclined surface 2D of the magnet 2. The diameter $D_{2A}$ of the first surface 2A is set, for example, to around 0~10 mm, and the diameter $D_{2B}$ of the second surface 2B is set, for example, to around 10~60 mm.

In the cross section taken by cutting the magnet 2 on a plane including the center of axis C, out of the ends of the curve corresponding to the curved inclined surface 2D, it is preferable for a maximum distance L from a line segment S joining an end 2Da at a outermost position in the radial direction of the magnet 2 and an end 2Db at an innermost position in the radial direction (the outermost edge 21E of the first surface 2A) of the aforementioned curve (the curve corresponding to the curved inclined surface 2D) in a direction orthogonal to the line segment S to be 0.5~4 mm. When the maximum distance L is less than 0.5 mm or exceeds 4 mm, there are concerns that precisely detecting the angle of rotation on the basis of the magnetic field intensities $H_r$ and $H_\theta$ in the radial direction and/or the circumferential direction could become difficult.

The curved inclined surface 2D of the magnet 2 in this exemplary embodiment may include first through Nth curved sections (where N is an integer that is at least 1) $2D_1$-$2D_N$. Here, the first through Nth curved sections $2D_1$-$2D_N$ each includes continuous differential values, and in a cross section when cutting the magnet 2 in a plane containing the axis of rotation C, the lengths of line segments $S_1$~$S_N$ joining the two ends of each of the curved sections $2D_1$-$2D_N$ (the end at the outermost position in the radial direction of the magnet 2 and the end at the innermost position in each of the curved sections $2D_1$~$2D_N$) are 3 mm or more. In this case, either the maximum distances $L_1$~$L_N$ from the line segments $S_1$~$S_N$ joining the two ends of the curves corresponding respectively to the first through Nth curved sections $2D_1$-$2D_N$ to the aforementioned curves in the orthogonal direction with respect to the line segments $S_1$~$S_N$ (the curves corresponding to the first through Nth curved sections $2D_1$~$2D_N$), or the maximum distance L from the curved inclined surface 2D, is preferably 0.5~4 mm, and more preferably 1.5~3 mm. Even if the maximum distance L from the curved inclined surface 2D is 0.1 mm, if the maximum distance LK of the Kth curved section (where K is an integer at least 1 and not more than N) $2D_K$ is within the range 0.5~4 mm, a region can be formed below the Kth curved section $2D_K$ in which the amplitudes of the magnetic field intensities $H_r$ and $H_\theta$ in the radial direction and the circumferential direction are mutually the same.

Figure 3A:
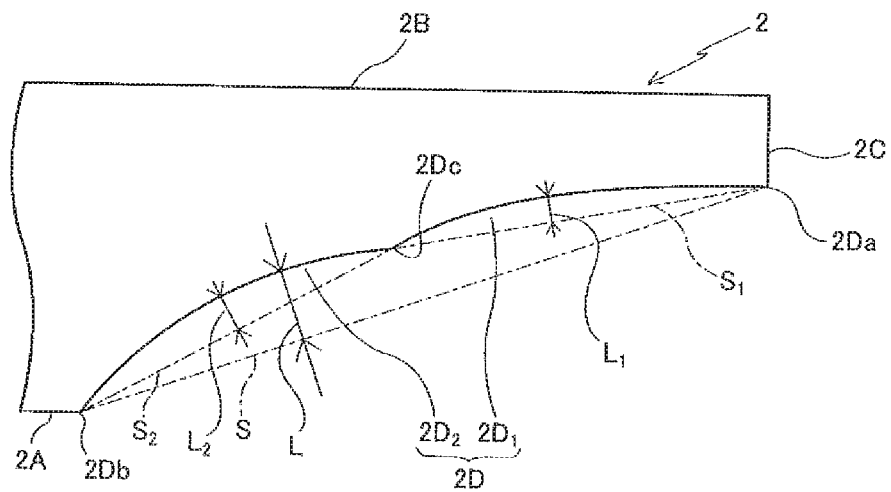
FIG. 3A and FIG. 3B are partial enlarged side views showing another configuration (part 1) of the main section of the magnet in the exemplary embodiment of the present invention.
Figure 3B:
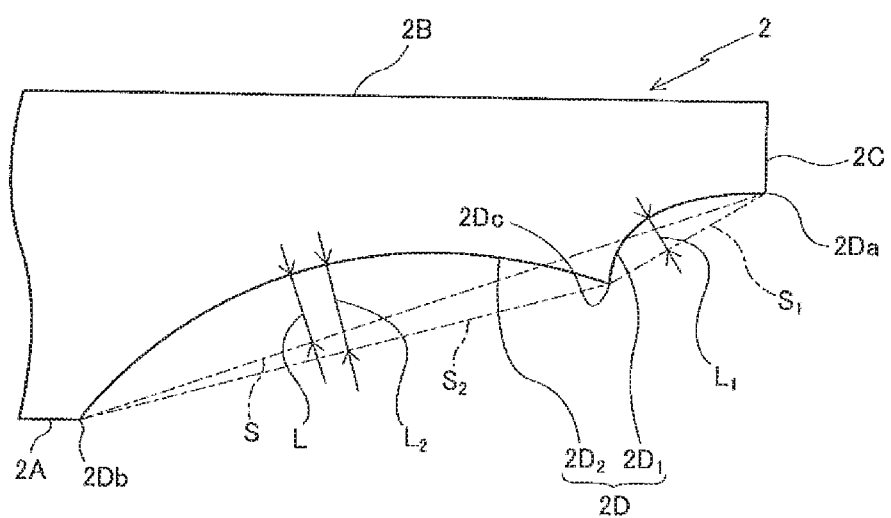

For example, as shown in FIG. 3A and FIG. 3B, the curved inclined surface 2D may also include a first curved section $2D_1$ and a second curved section $2D_2$ having as an end a point 2Dc between an end 2Da at the outermost position in the radial direction of the magnet 2 and an end 2Db at the innermost position in the radial direction. In this case, assuming that the maximum distance L from the curved inclined surface 2D is the maximum distance from the line segment S joining the two ends 2Da and 2Db to the curves respectively corresponding to the first curved section $2D_1$ and the second curved section $2D_2$ in a directional orthogonal to the line segment S, any out of the maximum distance L, the maximum distance $L_1$ from a line segment $S_1$ joining the two ends 2Da and 2Dc of the first curved section $2D_1$ in a direction orthogonal to the line segment $S_1$, and the maximum distance $L_2$ from a line segment $S_2$ joining the two ends 2Db and 2Dc of the second curved line $2D_2$ in a direction orthogonal to the line segment $S_2$ is preferably 0.5~4 mm, and more preferably 1.5~3 mm.

Figure 4A:
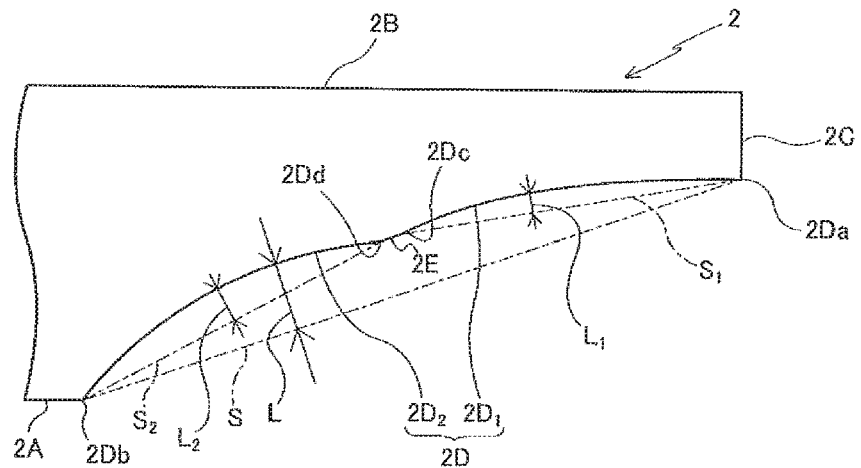
FIG. 4A through FIG. 4C are partial enlarged side views showing another configuration (part 2) of the main section of the magnet in the exemplary embodiment of the present invention.
Figure 4B:
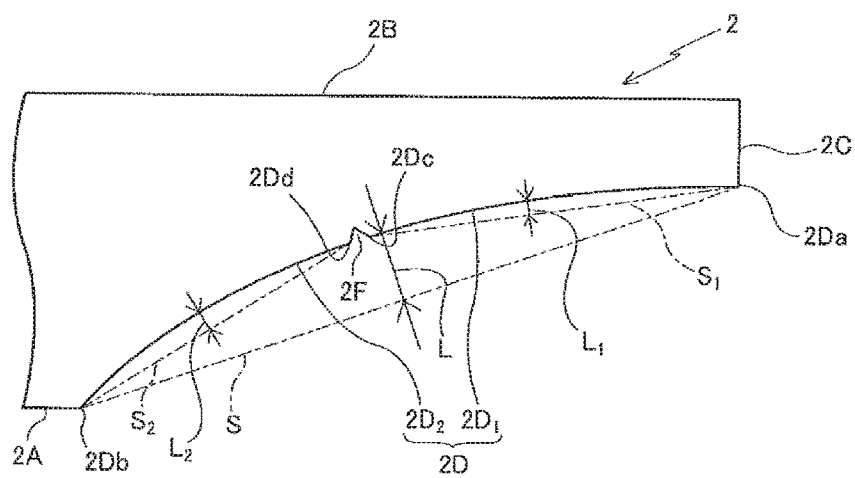
Figure 4C:
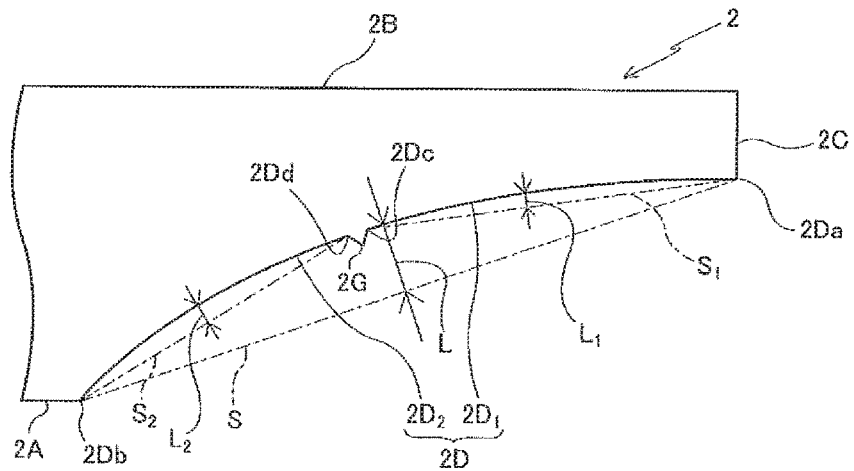

In addition, as shown in FIGS. 4A~4C, the curved inclined surface 2D may also include a planar section 2E, a concave section (notch) 2F or a convex section (protrusion) between the ends 2Da and 2Db of the curved inclined surface 2D, and include the first curved section $2D_1$ and the second curved section $2D_2$ respectively having as ends the origins 2Dc and 2Dd of the planar section 2E, the concave section (notch) 2F or the convex section (protrusion) 2G. In this case, assuming that the maximum distance L from the curved inclined surface 2D is the maximum distance from the line segment S joining the two ends 2Da and 2Db to the curved line corresponding to the curves respectively corresponding to the first curved section $2D_1$ and the second curved section $2D_2$ in the direction orthogonal to the line segment S, any of the maximum distance L, the maximum distance $L_1$ from the line segment $S_1$ joining the two ends 2Da and 2Dc of the first curved section $2D_1$ in a direction orthogonal to the line segment $S_1$ and the maximum distance $L_2$ from a line segment $S_2$ joining the two ends 2Db and 2Dd of the second curved section $2D_2$ in a direction orthogonal to the line segment $S_2$ is preferably 0.5~4 mm, and more preferably is 1.5~3 mm.

Figure 5:
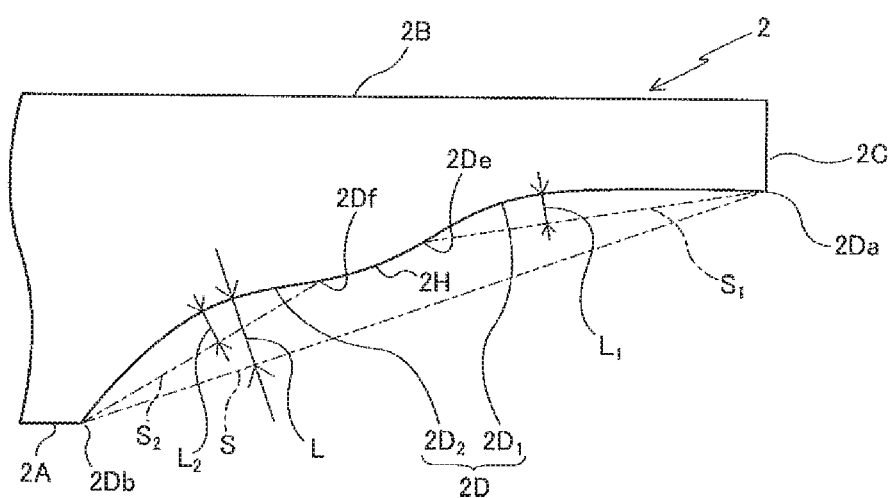
FIG. 5 is a partial enlarged side view showing another configuration (part 3) of the main section of the magnet in the exemplary embodiment of the present invention.

Furthermore, as shown in FIG. 5, it would be fine for the curved inclined surface 2D to be such that the curve corresponding to the curved inclined surface 2D has a wave-like shape, and to include a convex curved section 2H between the ends 2Da and 2Db of the curved inclined surface 2D, and a first curved section $2D_1$ and a second curved section $2D_2$ sandwiching from both sides the convex curved section 2H. In this case, the first curved section $2D_1$ is defined as a concave section between the end 2Da and an inflection point 2De. The second curved section $2D_2$ is defined as the concave section between the end 2Db and an inflection point 2Df. The convex curved section 2H is defined as the convex section between the inflection points 2De and 2Df. Furthermore, any of the maximum distance L from the curved inclined surface 2D, the maximum distance $L_1$ from a line segment $S_1$, joining the section 2Da of the first curved section $2D_1$ and the inflection point 2De in a direction orthogonal to the line segment $S_1$, and the maximum distance $L_2$ from a line segment $S_2$, joining the end 2Db of the second curved section $2D_2$ and the inflection point 2Df, in a direction orthogonal to the line segment $S_2$, is preferably 0.5~4 mm, and more preferably 1.5~3 mm.

In the state shown in FIG. 2, N is 1, and the curved inclined surface 2D is configured only by the first curved section $2D_1$.

In the magnet 2 of this exemplary embodiment, a ratio between a volume $V_{21}$ of the first magnet section 21 and a volume $V_{22}$ of the second magnet section 22 is preferably 1:4 or less, and more preferably 1:3 or less, and even more preferably 1:2 or less. If the volume ratio ($V_{21}$:$V_{22}$) is within the aforementioned range, the amplitudes of the magnetic field intensity $H_r$ in the radial direction and the magnetic field intensity $H_\theta$ in the circumferential direction can be made substantially the same, making it possible to precisely detect the angle of rotation on the basis of these.

Figure 6:
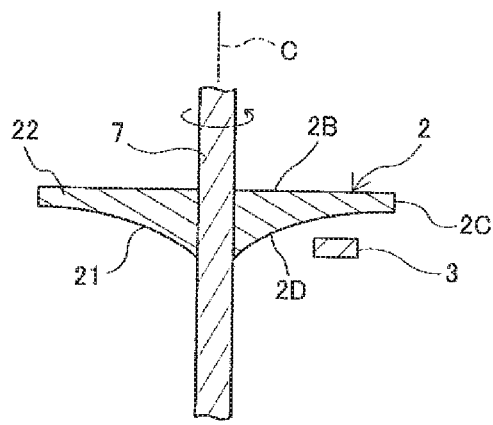
FIG. 6 is a cross sectional view showing another configuration (part 1) of the magnet in the exemplary embodiment of the present invention.
Figure 9:
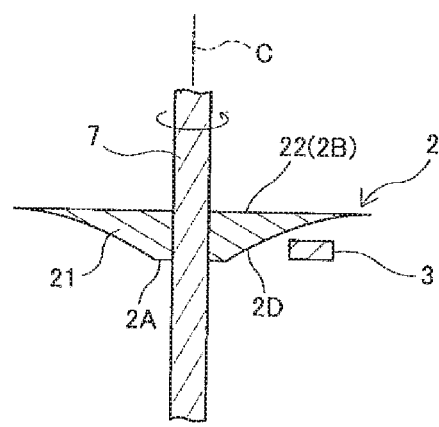
FIG. 9 is a cross sectional view showing another configuration (part 4) of the magnet in the exemplary embodiment of the present invention.
Figure 7:
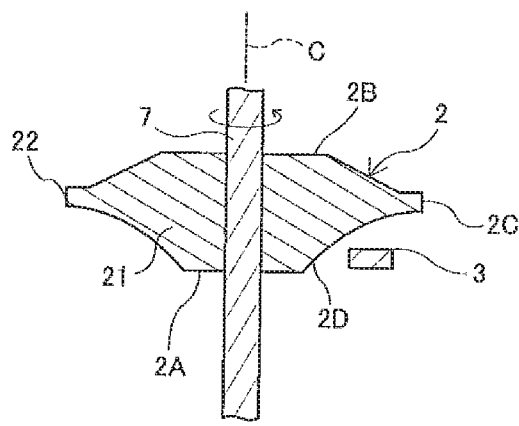
FIG. 7 is a cross sectional view showing another configuration (part 2) of the magnet in the exemplary embodiment of the present invention.
Figure 10:
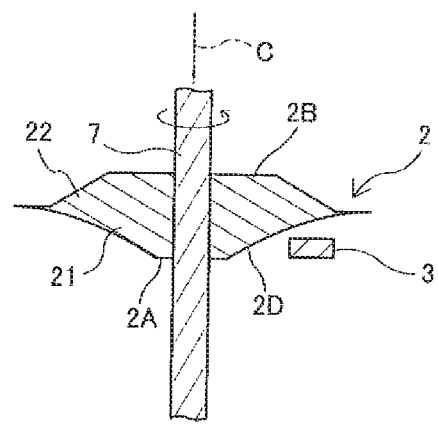
FIG. 10 is a cross sectional view showing another configuration (part 5) of the magnet in the exemplary embodiment of the present invention.
Figure 8:
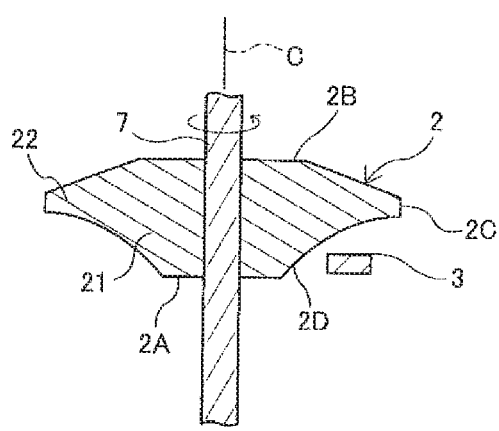
FIG. 8 is a cross sectional view showing another configuration (part 3) of the magnet in the exemplary embodiment of the present invention.

The magnet 2 in this exemplary embodiment is not limited to the state shown in FIG. 1A and FIG. 2. For example, the first magnet section 21 may be structured without the first surface 2A and such that one end (the bearing 9 side end) of the curved inclined surface 2D abuts the second shaft 7 (see FIG. 6). In addition, it may be structured such that the second magnet section 22 has a side surface 2C and protrudes while being inclined toward the second surface 2B side from an innerposition more in the radial direction of the magnet 2 than the side surface 2C of a base integral with the first magnet section 21 (see FIG. 7). Further, the magnet 2 may be structured to protrude while being inclined toward the second surface 2B side from the end (shaft coupling 8 side end) of the side surface 2C (see FIG. 8). Furthermore, the second magnet section 22 may have a structure not including the side surface 2C (see FIG. 9). Further, the magnet 2 may have a structure that protrudes while being inclined toward the second surface 2B side from an innerposition more in the radial direction of the magnet 2 than an outermost edge of the magnet 2 or from the outermost edge (see FIGS. 10, 11).

In this exemplary embodiment, a length (a length along the axis of rotation C) $L_{28}$ between the shaft coupling 8 and the second surface 2B of the magnet 2 is set, for example, around 10 mm or less, and preferably around 5 mm or less. In addition, a length (a length along the axis of rotation C) $L_{29}$ between the bearing 9 and the first surface 2A of the magnet 2 is set around 8 mm or less, and preferably around 5 mm or less. When the shaft coupling 8 and the bearing 9 positioned with the above-described spacing with respect to the magnet 2 are configured with magnetic materials, the magnetic field intensity $H_r$ in the radial direction and the magnetic field intensity $H_\theta$ in the circumferential direction at a prescribed position on the circular virtual plane Vf centered at the axis of rotation C, orthogonal to the axis of rotation C and passing through the region below the curved inclined surface 2D can be strengthened, and errors in detecting the angle of rotation can be improved. In addition, a below-described magnetic sensor placeable region 5 (see FIG. 14A and FIG. 14B) can be enlarged, which also has the effect of increasing design freedom of the magnetic sensor 3 in the rotational angle detection apparatus 1.

Figure 12A:
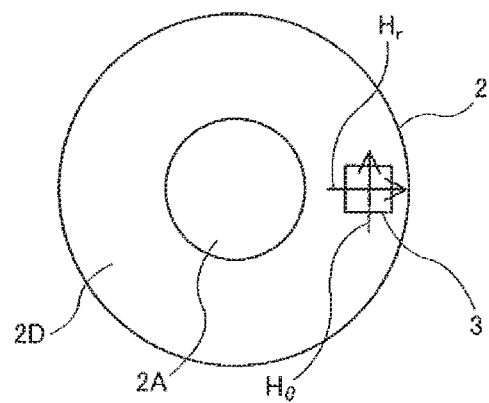
FIG. 12A is a schematic view showing magnetic field intensities (magnetic field intensity in a radial direction and a circumferential direction) detected by a magnetic sensor in the exemplary embodiment of the present invention.
Figure 12B:
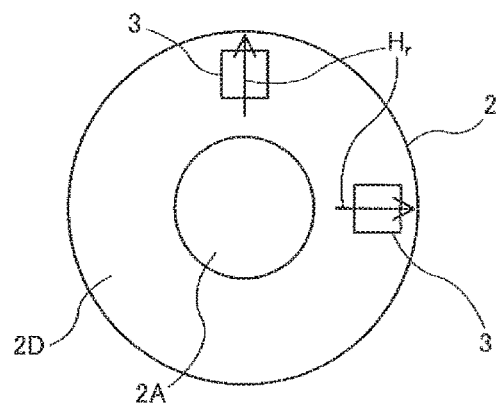
FIG. 12B is a schematic view showing another configuration of the magnetic field intensity (magnetic field intensity in the radial direction) detected by the magnetic sensor.
Figure 12C:
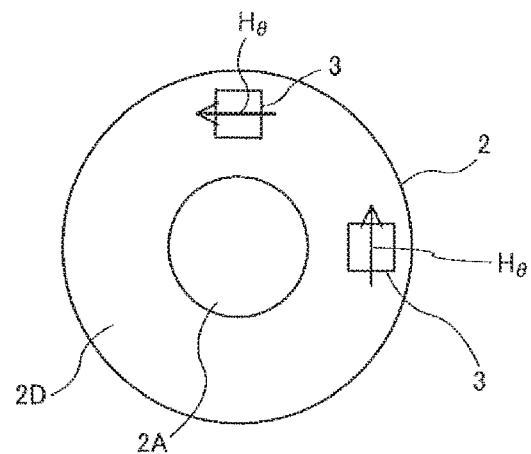
FIG. 12C is a schematic view showing another configuration of the magnetic field intensity (magnetic field intensity in the circumferential direction) detected by the magnetic sensor.

The magnetic sensor 3 in this exemplary embodiment is disposed at a position where the amplitudes of the magnetic field intensity $H_r$ in the radial direction and the magnetic field intensity $H_\theta$ in the circumferential direction at a prescribed position on the circular virtual plane Vf centered at the axis of rotation C, orthogonal to the axis of rotation C and passing through the region below the curved inclined surface 2D are virtually the same. In this exemplary embodiment, as shown in FIG. 12A, a state in which one magnetic sensor 3 capable of detecting the magnetic field intensity $H_r$ in the radial direction and the magnetic field intensity $H_\theta$ in the circumferential direction is provided is cited as an example, but this is not limited to such a state. For example, as shown in FIG. 12B and FIG. 12C, it would be fine to provide two magnetic sensors 3 arranged with a 900 spacing centered on the axis of rotation C of the second shaft 7. In this case, the two magnetic sensors 3 may each detect the magnetic field intensity $H_r$ in the radial direction (see FIG. 12B), and may each detect the magnetic field intensity $H_\theta$ in the circumferential direction (see FIG. 12C).

When a plurality of magnetic sensors 3 is disposed, at least two of the plurality of magnetic sensors 3 may be disposed with a spacing of substantially $(180/M)°$ (where M is an integer that is at least 2, and is preferably an integer that is 2-5), centered at the axis of rotation C of the second shaft 7. In signals output from the magnetic sensors 3, M-order high frequency error components are included. However, by disposing the magnetic sensors 3 with a spacing of $(180/M)°$ centered at the axis of rotation C, it is possible to eliminate the M-order high frequency error components, making it possible to further reduce errors in detecting the angle of rotation.

Figure 13:
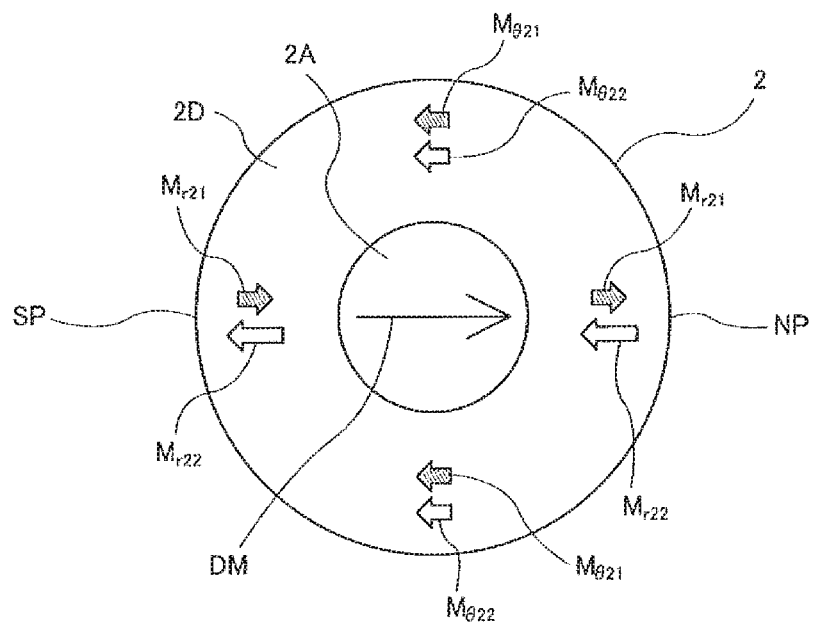
FIG. 13 is a view conceptually showing the magnetic field intensities in the radial direction and the circumferential direction below a first surface of the magnet in the exemplary embodiment of the present invention.

In this exemplary embodiment, below the curved inclined surface 2D of the magnet 2, the magnetic field intensity $H_r$ in the radial direction and the magnetic field intensity $H_\theta$ in the circumferential direction at a prescribed position on the circular virtual plane Vf centered at the axis of rotation C, orthogonal to the axis of rotation C and passing through the region below the curved inclined surface 2D, can be respectively treated as the sum of a magnetic field $M_{r21}$ in the radial direction generated by the first magnet section 21 of the magnet 2 and a magnetic field $M_{r22}$ in the radial direction generated by the second magnet section 22, and the sum of a magnetic field $M_{\theta21}$ in the circumferential direction generated by the first magnet section 21 and a magnetic field $M_{\theta22}$ in the circumferential direction generated by the second magnet section 22 (see FIG. 13).

When magnetized in the in-surface direction of the magnet 2, as in this exemplary embodiment, the size of the magnetic field intensity $H_r$ in the radial direction on the circular virtual plane Vf is a maximum near an N-pole side end NP and near an S-pole side end SP, respectively, and is a minimum at positions rotated 90° about the shaft 5 from the N-pole side end NP and the S-pole side end SP, respectively. On the other hand, the size of the magnetic field intensity $H_\theta$ in the circumferential direction is a maximum at positions rotated 90° about the shaft 5 from the N-pole side end NP and the S-pole side end SP, respectively, and is a minimum near the N-pole side end NP and near the S-pole side end SP.

In this exemplary embodiment, the direction of the magnetic field $M_{r21}$ in the radial direction generated by the first magnet section 21 is parallel to a magnetization direction DM of the magnet 2, at the N-pole side end NP and the S-pole side end SP, respectively, but the direction of the magnetic field $M_{r22}$ in the radial direction generated by the second magnet section 22 is antiparallel to the magnetization direction DM of the magnet 2. Furthermore, the size of the magnetic field $M_{r21}$ in the radial direction generated by the first magnet section 21 (magnetic field intensity $H_{r21}$) is smaller than the size of the magnetic field $M_{r22}$ in the radial direction generated by the second magnet section 22 (magnetic field intensity $H_{r22}$) ($H_{r21}<H_{r22}$). In FIG. 13, the sizes of the various magnetic fields $M_{r21}$, $M_{r22}$, $M_{\theta21}$ and $M_{\theta22}$ (magnetic field intensities $H_{r21}$, $H_{r22}$, $H_{\theta21}$ and $H_{\theta22}$) are expressed by arrow lengths.

On the other hand, the direction of the magnetic field $M_{\theta21}$ in the circumferential direction generated by the first magnet section 21 at positions rotated 90° about the second shaft 7 from the N-pole side end NP and the S-pole side end SP and the direction of the magnetic field $M_{\theta22}$ in the circumferential direction generated by the second magnet section 22 are both antiparallel to the magnetization direction DM of the magnet 2, and the sizes of these magnetic fields $H_{\theta21}$ and $H_{\theta22}$ are smaller than the size of the magnetic field $M_{r22}$ (magnetic field intensity $H_{r22}$) in the radial direction generated by the second magnet section 22 at the N-pole side end NP and the S-pole side end SP ($H_{r22}>H_{\theta21}$, $H_{\theta22}$). Through this, the maximum value and the minimum value of the magnetic field intensity $H_r$ in the radial direction are substantially the same as the maximum value and the minimum value of the magnetic field intensity $H_\theta$ in the circumferential direction.

Figure 14A:
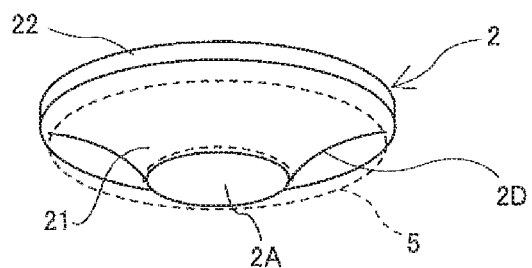
FIG. 14A is an perspective view schematically showing the magnet and magnetic sensor placeable regions in the exemplary embodiment of the present invention.
Figure 14B:
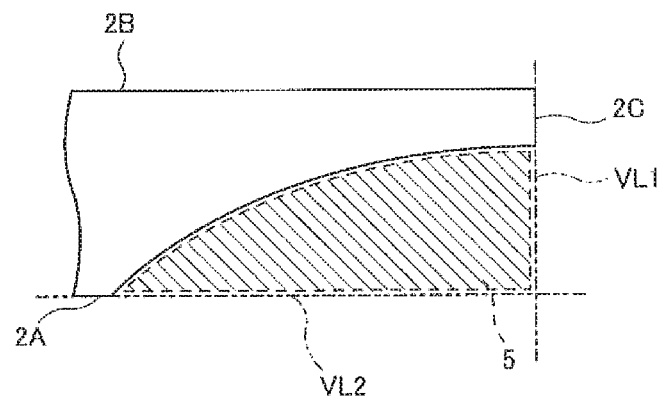
FIG. 14B is a side view of FIG. 14A.
Figure 15:
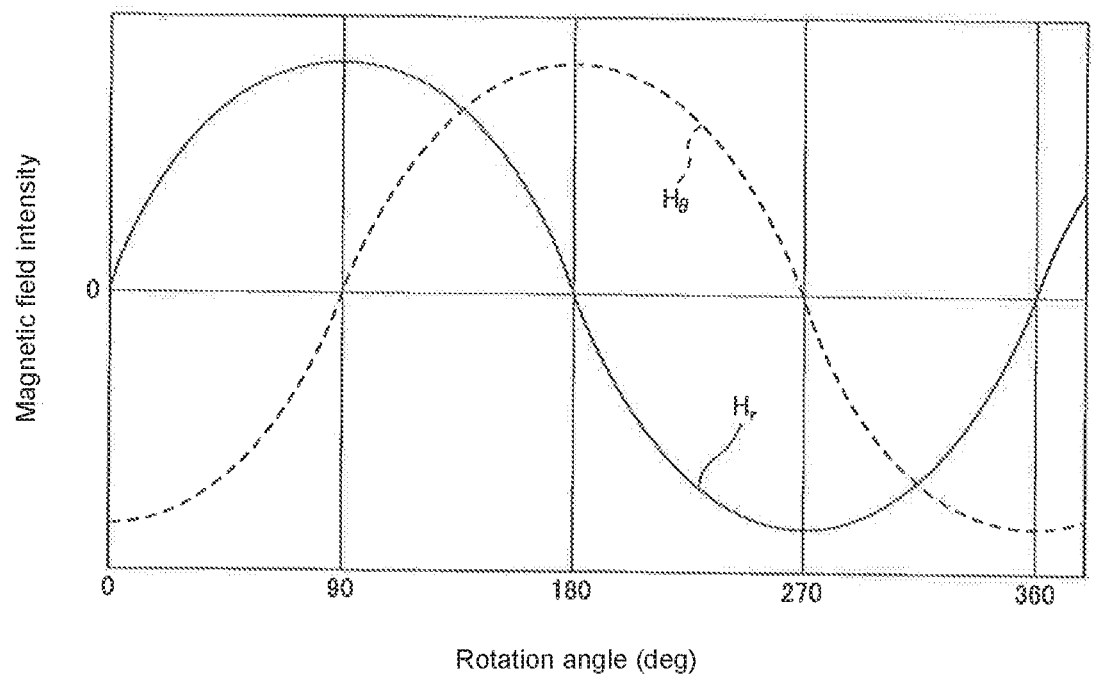
FIG. 15 is a graph showing the amplitude of the magnetic field intensity detected in the rotational angle detection apparatus according to the exemplary embodiment of the present invention.

As noted above, below the curved inclined surface 2D of the magnet 2 in this exemplary embodiment, a region (magnetic sensor placeable region) is generated in which the amplitudes of the magnetic field intensities $H_r$ and $H_\theta$ in the radial direction and circumferential direction at a prescribed position on the circular virtual plane Vf centered at the axis of rotation C, orthogonal to the axis of rotation C and passing through the region below the curved inclined surface 2D are substantially equal to each other. This magnetic sensor placeable region 5 is a ring-shaped region about the shaft 7 enclosed by a first virtual plane VL1 parallel to the axis of rotation C and including the side surface 2C of the second magnet section 22 of the magnet 2, a second virtual plane VL2 orthogonal to the axis of rotation C and including the first surface 2A, and the curved inclined surface 2D, as shown in FIG. 14A and FIG. 14B. Accordingly, by disposing the magnetic sensor 3 in the magnetic sensor placeable region 5, the amplitude of the magnetic field intensity $H_r$ in the radial direction on the circular virtual plane Vf centered at the axis of rotation C, orthogonal to the axis of rotation C and passing through the magnetic sensor placeable region, and the amplitude of the magnetic field intensity $H_\theta$ in the circumferential direction of the magnet 2, can be made substantially the same (see FIG. 15), making it possible to reduce errors in detecting the angle of rotation by the rotational angle detection apparatus 1 according to this exemplary embodiment.

The magnetic sensor 3 in this exemplary embodiment includes at least one magnetic detection element. The magnetic sensor 3 may include a pair of magnetic detection elements connected in series, as the at least one magnetic detection element. In this case, the magnetic sensor 3 has a first and a second detection circuit, including a first pair of magnetic detection elements connected in series and a second pair of magnetic detection elements connected in series.

Figure 16A:
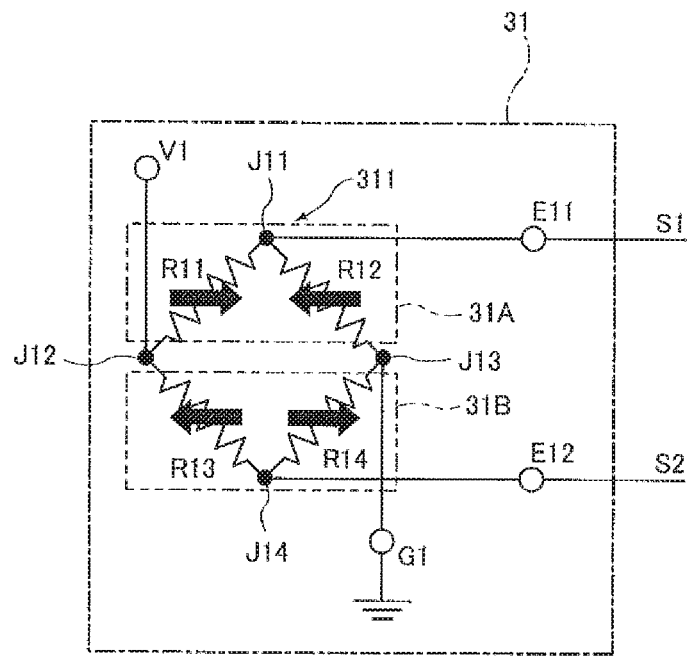
FIG. 16A and FIG. 16B are circuit diagrams schematically showing one configuration of a circuit configuration of the magnetic sensor in the exemplary embodiment of the present invention.

As shown in FIG. 16A, a first detection circuit 31 included in the magnetic sensor 3 has a power source port V1, a ground port G1, two output ports E11 and E12 and a first Wheatstone bridge circuit 311. The first Wheatstone bridge circuit 311 has a first signal generator 31A, including a first pair of magnetic detection elements R11 and R12 connected in series, and a second signal generator 31B, including a second pair of magnetic detection elements R13 and R14 connected in series. A junction point J12 of the magnetic detection elements R11 and R13 is connected to the power source port V1. A junction point J11 of the magnetic detection elements R11 and R12 is connected to the output port E11. A junction point J14 of the magnetic detection elements R13 and R14 is connected to the output port E12. A junction point J13 of the magnetic detection elements R12 and R14 is connected to the ground port G1. A power source voltage of a prescribed size is applied to the power source port V1, and the ground port G1 is connected to ground. A first signal S1 generated by the first signal generator 31A is output from the output port E11, and a second signal S2 generated by the second signal generator 31B is output from the output port E12.

Figure 16B:
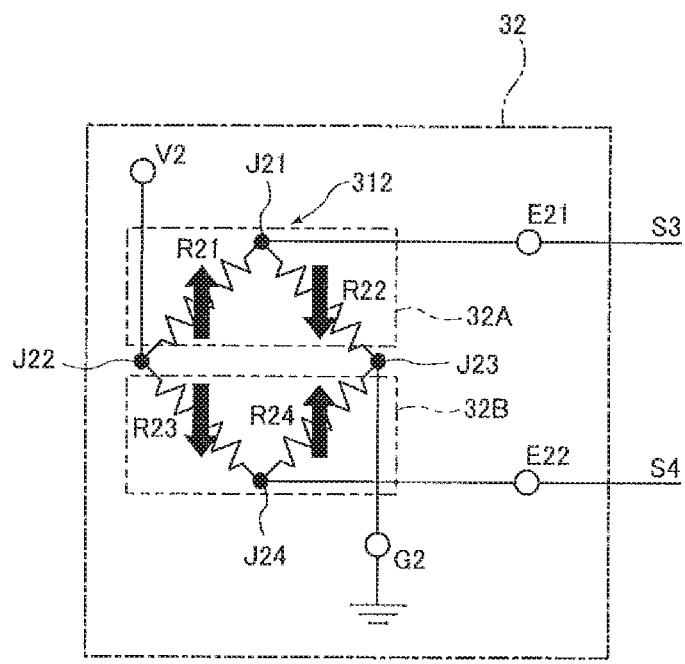

In addition, as shown in FIG. 16B, a second detection circuit 32 included in the magnetic sensor 3 has a power source port V2, a ground port G2, two output ports E21 and E22 and a second Wheatstone bridge circuit 312. The second Wheatstone bridge circuit 312 has a third signal generator 32A, containing a third pair of magnetic detection elements R21 and R22 connected in series, and a fourth signal generator 32B, containing a fourth pair of magnetic detection elements R23 and R24 connected in series. A junction point J22 of the magnetic detection elements R21 and R23 is connected to the power source port V2. A junction point J21 of the magnetic detection elements R21 and R22 is connected to the output port E21. A junction point J24 of the magnetic detection elements R23 and R24 is connected to the output port E22. A junction point J23 of the magnetic detection elements R22 and R24 is connected to the ground port G2. A power source voltage of a prescribed size is applied to the power source port V2, and the ground port G2 is connected to ground. A third signal S3 generated by the third signal generator 32A is output from the output port E21, and a fourth signal S4 generated by the fourth signal generator 32B is output from the output port E22.

In this exemplary embodiment, magnetoresistive effect elements (MR elements) such as TMR elements, GMR elements, AMR elements or the like can be used as all of the magnetic detection elements R11~R14 and R21~R24 contained in the first and second detection circuits 31 and 32, and using TMR elements is particularly preferable. TMR elements and GMR elements have a magnetization fixed layer in which the magnetization direction is fixed, a free layer in which the magnetization direction changes in accordance with the direction of an applied magnetic field, and a non-magnetic layer positioned between the magnetization fixed layer and the free layer.

Figure 17:
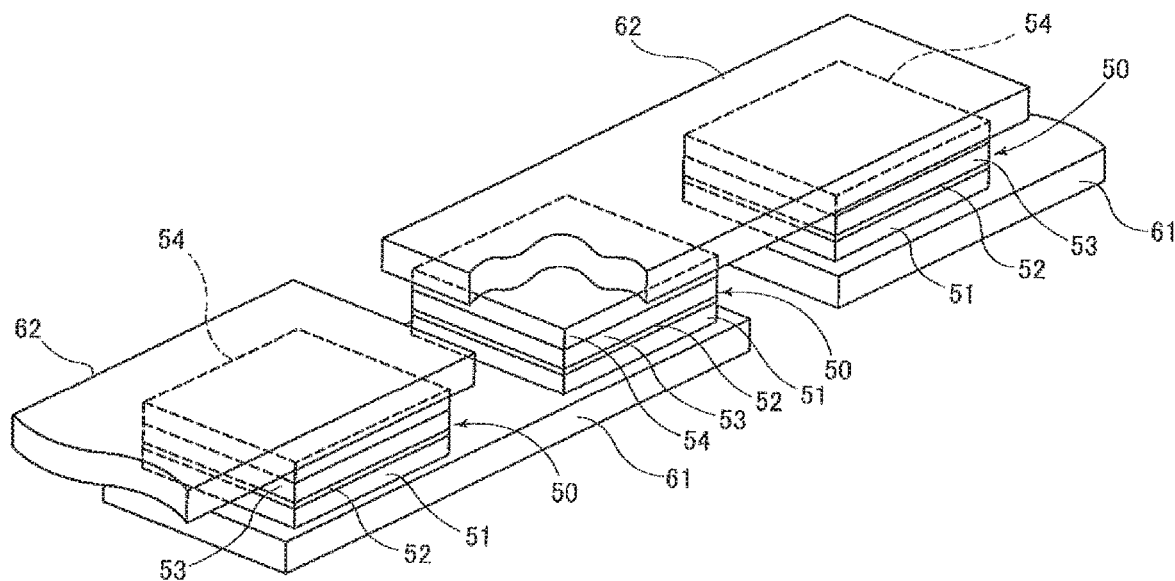
FIG. 17 is an perspective view showing a schematic configuration of an MR element as a magnetic detection element in the exemplary embodiment of the present invention.

Specifically, as shown in FIG. 17, TMR elements and GMR elements have a plurality of lower electrodes 61, a plurality of MR films 50 and a plurality of upper electrodes 62. The plurality of lower electrodes 61 are disposed on a substrate (unrepresented). Each of the lower electrodes 61 has a long, slender shape. A gap is formed between two lower electrodes 61 adjacent in the lengthwise direction of the lower electrodes 61. MR films 50 are respectively disposed near the two ends in the lengthwise direction on the top surface of the lower electrodes 61. The MR films 50 contain a free layer 51, a non-magnetic layer 52, a magnetization fixed layer 53 and an antiferromagnetic layer 54, layered in order from the lower electrode 61 side. The free layer 51 is electrically connected to the lower electrode 61. The antiferromagnetic layer 54 is configured by antiferromagnetic material, and serves the role of fixing the magnetization direction of the magnetization fixing layer 53, by causing exchange coupling to occur with the magnetization fixing layer 53. The plurality of upper electrodes 62 is disposed on top of the plurality of MR films 50. Each of the upper electrodes 62 has a long, slender shape, is positioned on top of two lower electrodes 61 adjacent in the lengthwise direction of the upper electrodes 61, and electrically connects the antiferromagnetic layers 54 of the adjacent two MR films 50. The MR films 50 may have a configuration in which the free layer 51, the non-magnetic layer 52, the magnetization fixed layer 53 and the antiferromagnetic layer 54 are layered in order from the upper electrode 62 side.

In the TMR elements, the non-magnetic layer 52 is a tunnel barrier layer. In the GMR elements, the non-magnetic layer 52 is a non-magnetic conduction layer. In the TMR elements and the GMR elements, the resistance value changes in accordance with an angle formed by the magnetization direction of the free layer 51 with respect to the magnetization direction of the magnetization fixed layer 53, and the resistance value is a minimum when this angle is 0° (when the magnetization directions are mutually parallel) and the resistance value is a maximum when this angle is 180° (when the magnetization directions are mutually antiparallel).

In FIG. 16A, the magnetization direction of the magnetization fixed layers of the magnetic detection elements R11~R14 is indicated by filled arrows. In the first detection circuit 31, the magnetization direction of the magnetization fixed layers 53 of the magnetic detection elements R11 and R14, and the magnetization direction of the magnetization fixed layers 53 of the magnetic detection elements R12 and R13, are mutually antiparallel directions, and are orthogonal to the radial direction of the magnet 2.

In the first signal generator 31A, when the magnetic field intensity $H_r$ in the radial direction changes through rotation of the magnet 2, the magnetization direction of the free layer 51 of the magnetic detection elements R11 and R23 changes in accordance therewith, and the electric potential of the junction point J11 changes on the basis of the relative angle between the magnetization direction of the free layer 51 and the magnetization direction of the magnetization fixed layer 53. In addition, in the second signal generator 31B as well, similarly the electric potential of the junction point J14 changes on the basis of the relative angle between the magnetization direction of the free layer 51 of the magnetic detection elements R13 and R14, and the magnetization direction of the magnetization fixed layer 53. Accordingly, the first signal generator 31A generates the first signal S1 in accordance with the magnetic field intensity $H_r$ in the radial direction, and the first signal S1 is output from the output port E11. The second signal generator 31B generates the second signal S2 in accordance with the magnetic field intensity $H_r$ in the radial direction, and the second signal S2 is output from the output port E12.

Similarly, in FIG. 16B, the magnetization direction of the magnetization fixing layer of the magnetic detection elements R21-R24 is indicated by filled arrows. In the second detection circuit 32, the magnetization direction of the magnetization fixed layer 53 of the magnetic detection elements R21 and R24, and the magnetization direction of the magnetization fixed layer 53 of the magnetic detection elements R22 and R23, are mutually antiparallel directions, and are parallel to the magnetization direction DM of the magnet 2.

In the third signal generator 32A, when the magnetic field intensity $H_θ$ in the circumferential direction changes through rotation of the magnet 2, the magnetization direction of the free layer 51 of the magnetic detection elements R21 and R22 changes in accordance therewith, and the electric potential of the junction point J21 changes on the basis of the relative angle between the magnetization direction of the free layer 51 and the magnetization direction of the magnetization fixed layer 53. In addition, in the fourth signal generator 32B, similarly the electric potential of the junction point J24 changes on the basis of the relative angle between the magnetization direction of the free layer 51 of the magnetic detection elements R23 and R24, and the magnetization direction of the magnetization fixed layer 53. Accordingly, the third signal generator 32A generates the third signal S3 in accordance with the magnetic field intensity $H_θ$ in the circumferential direction of the magnetic 2, and the third signal S3 is output from the output port E21. The fourth signal generator 32B generates the fourth signal S4 in accordance with the magnetic field intensity $H_θ$ in the circumferential direction of the magnet 2, and the fourth signal S4 is output from the output port E22.

Figure 18:
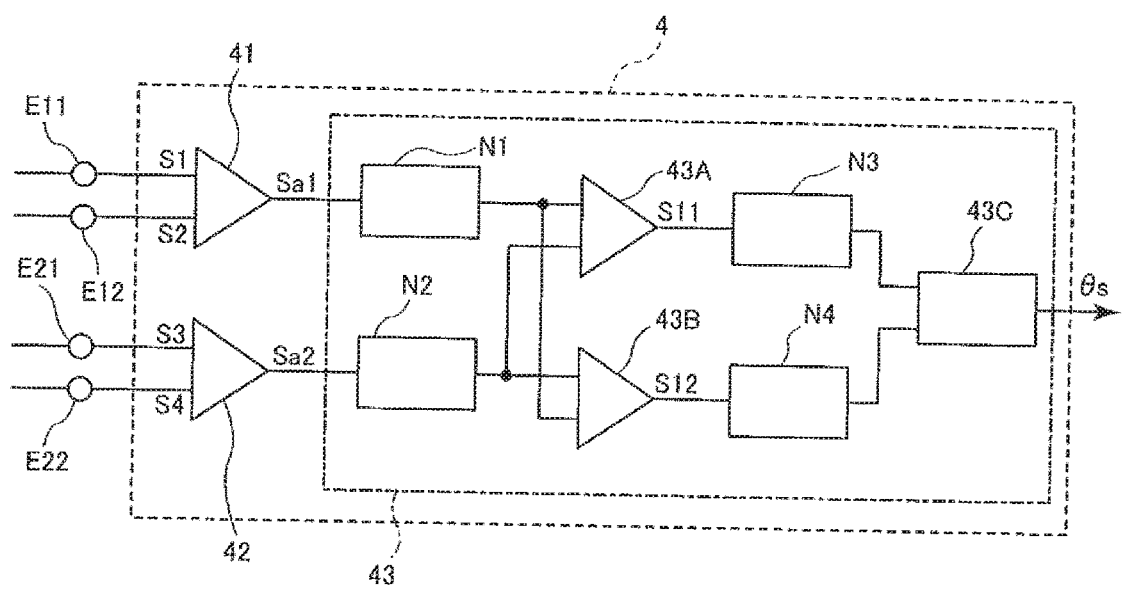
FIG. 18 is a circuit diagram schematically showing one aspect of a circuit configuration of a rotational angle detector in the exemplary embodiment of the present invention.

The rotational angle detector 4 in this exemplary embodiment has a first operation circuit 41, a second operation circuit 42 and a third operation circuit 43, as shown in FIG. 18, and generates a rotational angle detection value θs on the basis of the first through fourth signals S1-S4.

Two input ports of the first operation circuit 41 are respectively connected to the output ports E11 and E12. Two input ports of the second operation circuit 42 are respectively connected to the output ports E21 and E22. Two input ports of the third operation circuit 43 are respectively connected to the output ends of the first and second operation circuits 41 and 42.

The first operation circuit 41 generates a first post-operation signal Sa1 on the basis of the first and second signals S1 and S2. The second operation circuit 42 generates a second post-operation signal Sa2 on the basis of the third and fourth signals S3 and S4. The third operation circuit 43 calculates the rotational angle detection value θs on the basis of the first and second post-operation signals Sa1 and Sa2.

The first post-operation signal Sa1 is generated through an operation finding the difference between the first signal S1 and the second signal S2 (S1-S2). The second post-operation signal Sa2 is generated through an operation finding the difference between the third signal S3 and the fourth signal S4 (S3-S4).

The third operation circuit 43 has normalization circuits N1-N4, an addition circuit 43A, a subtraction circuit 43B and an operator 43C. The normalization circuits N1~N4 each have an input port and an output port. The addition circuit 43A, the subtraction circuit 43B and the operator 43C each have two input ports and one output port.

The output port of the first operation circuit 41 is connected to the input port of the normalization circuit N1. The output port of the second operation circuit 42 is connected to the input port of the normalization circuit N2. Each output port of the normalization circuits N1 and N2 is connected to the two input ports of the addition circuit 43A, and each output port of the normalization circuits N1 and N2 is connected to the two input ports of the subtraction circuit 43B. The output port of the addition circuit 43A is connected to the input port of the normalization circuit N3, and the output port of the subtraction circuit 43B is connected to the input port of the normalization circuit N4. The each output port of the normalization circuits N3 and N4 is connected to the two input ports of the operator 43C.

The normalization circuit N1 outputs a normalized value of the first post-operation signal Sa1 to the addition circuit 43A and the subtraction circuit 43B. The normalization circuit N2 outputs a normalized value of the second post-operation signal Sa2 to the addition circuit 43A and the subtraction circuit 43B. The normalization circuits N1 and N2 normalize the first and second post-operation signals Sa1 and Sa2 so that, for example, the maximum values of the first and second post-operation signals Sa1 and Sa2 both become 1, and the minimum values both become −1. In this exemplary embodiment, the normalized value of the first post-operation signal Sa1 becomes sin (θ+π/4), and the normalized value of the second post-operation signal Sa2 becomes sin (θ−π/4). Here, θ is the angle formed between the line segment joining the junction points J12 and J14 and an external magnetic field.

The addition circuit 43A accomplishes an operation of finding the sum of the normalized value of the first post-operation signal Sa1 and the normalized value of the second post-operation signal Sa2, and generates an addition signal S11. The subtraction circuit 43B accomplishes an operation of finding the difference between the normalized value of the first post-operation signal Sa1 and the normalized value of the second post-operation signal Sa2, and generates a subtraction signal S12. The additional signal S11 and the subtraction signal S12 are expressed by the following equations.

$$S11 = \sin(θ − π/4) + \sin(θ + π/4)$$
$$= 2 \sin θ \cdot \cos(−π/4)$$
$$= 1.41 \sin θ$$

$$S12 = \sin(θ + π/4) − \sin(θ − π/4)$$
$$= 2 \cos θ \cdot \sin(π/4)$$
$$= 1.41 \cos θ$$

The normalization circuit N3 outputs a normalized value S21 of the addition signal S11 to the operator 43C. The normalization circuit N4 outputs a normalized value S22 of the subtraction signal S12 to the operator 43C. The normalization circuits N3 and N4 normalize the addition signal S11 and the subtraction signal S12 so that, for example, the maximum values of the addition signal S11 and the subtraction signal S12 both become 1 and the minimum values both becomes −1. In this exemplary embodiment, the normalized value S21 of the addition signal S11 is sin θ, and the normalized value S22 of the subtraction signal S12 is cos θ.

The operator 43C calculates a rotational angle detection value θs having a correspondence relationship with the angle θ, based on the values S21 and S22. For example, the operator 43C calculates the rotational angle detection value θs from the below equation:

$$θs = \arctan(S21/S22)$$

When the rotational angle detection value θs is in the range of at least 0° and less than 360°, the solution to the rotational angle detection value θs by the above equation will be two values differing by 180°. However, through positive and negative combinations of the values S21 and S22, it is possible to determine which of the two values is the true value of the rotational angle detection value θs. That is to say, when the value S21 is a positive value, the rotational angle detection value θs is larger than 0° and smaller than 180°. When the value S21 is a negative value, the rotational angle detection value θs is larger than 180° and smaller than 360°. When the value S22 is a positive value, the rotational angle detection value θs is in the range of at least 0° and less than 90°, and larger than 270° and less than 360°. When the value S22 is a negative value, the rotational angle detection value θs is larger than 90° and smaller than 270°. The operator 43C, through the rotational angle detection value θs found from the above equation and positive and negative combinations of the values S21 and S22, can find the true value of the rotational value detection value θs within the range of at least 0° and less than 360°.

As discussed above, in the rotational angle detection apparatus 1 according to this exemplary embodiment, a region in which the amplitudes of the magnetic field intensities $H_r$ and $H_\theta$ in the radial direction and the circumferential direction are substantially the same (magnetic sensor placeable region 5) is created below the curved inclined surface 2D of the magnet 2. Furthermore, because the magnetic sensor 3 is disposed in the magnetic sensor placeable region 5, errors in detecting the angle of rotation can be reduced. In addition, because the rotational angle is detected through the magnetic field intensity $H_r$ in the radial direction and the magnetic field intensity $H_\theta$ in the circumferential direction, the appearance of errors in detecting the rotational angle caused by shaft shaking of the second shaft 7 can be suppressed. Furthermore, because the rotational angle detection value θs is calculated from the magnetic field intensity $H_r$ in the radial direction and the magnetic field intensity $H_\theta$ in the circumferential direction, the volume of the magnet 2 can be reduced. And furthermore, in the rotating machine apparatus 10 in this exemplary embodiment, because the first and second shafts 6 and 7, the shaft coupling 8 and the bearing 9 are configured by magnetic materials, the magnetic field intensities $H_r$ and $H_\theta$ detected by the magnetic sensor 3 can be amplified, and rotational angle detection precision by the rotational angle detection apparatus 1 can be improved.

The above-described exemplary embodiment is disclosed in order to facilitate understanding of the present invention, and is not intended to limit the present invention. Accordingly, the various elements disclosed in this exemplary embodiment are intended to also include all design changes and equivalents falling within the technical scope of the present invention.

For example, in the above-described exemplary embodiment, it would be fine for the magnetic sensor 3 to detect one out of the magnetic field intensity $H_r$ in the radial direction and the magnetic field intensity $H_\theta$ in the circumferential direction, and a magnetic field intensity $H_z$ in a direction along the axis of rotation C of the second shaft 7, and for the rotational angle detection value θs to be calculated by the rotational angle detector 4 on the basis of the magnetic field intensity $H_z$ in a direction along the axis of rotation C of the second shaft 7.

Figure 19A:
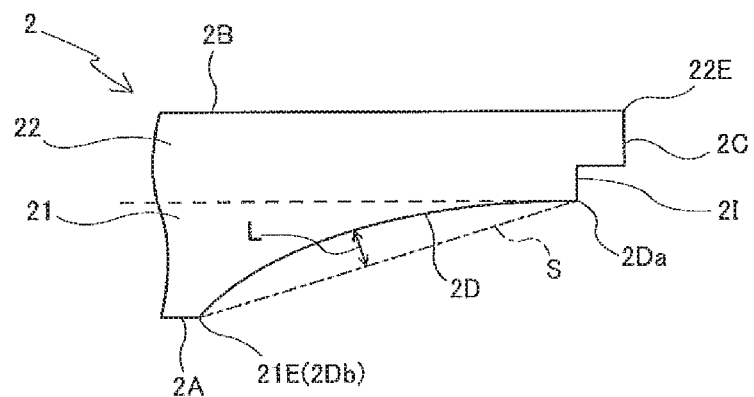
FIG. 19A and FIG. 19B are partial enlarged side views showing another configuration (part 1) of the magnet in the exemplary embodiment of the present invention.
Figure 19B:
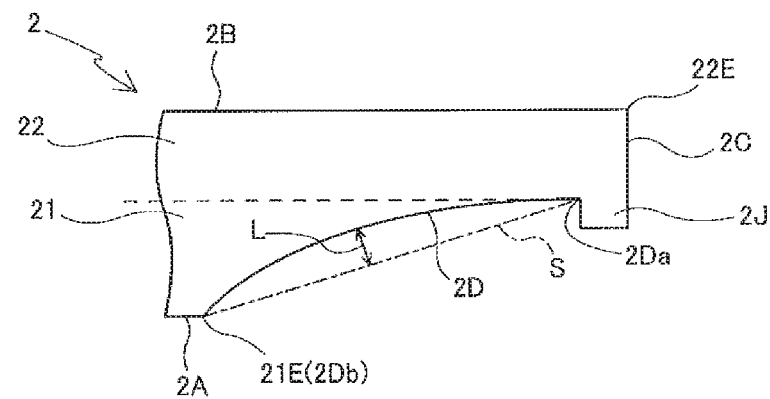

In the above-described exemplary embodiment, an example was cited in which the outer shape of the second magnet section 22 of the magnet 2 is substantially a disk shape, and the end 2Da in the outermost position in the radial direction of the curved inclined surface 2D of the magnet 2 is positioned on the side surface 2C of the magnet 2, that is to say, at the outermost edge of the magnet 2, but the present invention is not limited to this configuration. For example, as shown in FIG. 19A, it would be fine for the second magnet section 22 of the magnet 2 to include a notch 2I in which a portion of the underside (the first magnet section 21 side) of the side surface 2C is cut away, and for the end 2Da of the curved inclined surface 2D in the outermost position in the radial direction to be positioned to the inside in the radial direction from the side surface 2C of the magnet 2. In addition, as shown in FIG. 19B, it would be fine for the second magnet section 22 of the magnet 2 to have a protrusion 2J protruding toward the underside (the first magnet section 21 side) of the side surface 2C, and for the end 2Da of the curved inclined surface 2D at the outermost position in the radial direction to be positioned to the inside in the radial direction from the side surface 2C of the magnet 2. In such cases, the maximum distance L from the curved inclined surface 2D can be defined as the maximum distance from the line segment S joining the two ends 2Da and 2Db of the curve corresponding to the curved inclined surface 2D to the above-described curve in a direction orthogonal to the line segment S.

Figure 20A:
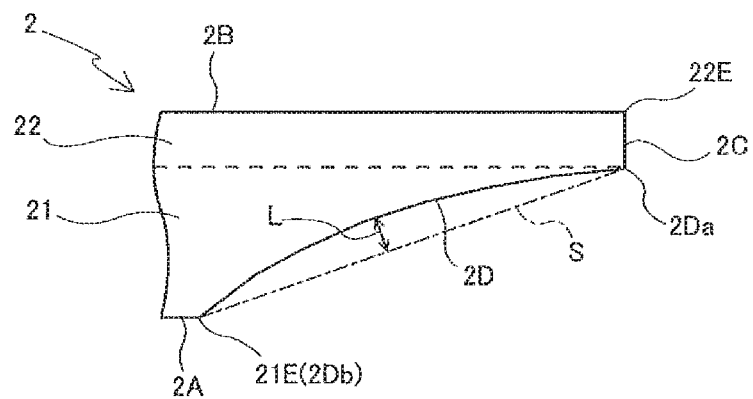
FIG. 20A and FIG. 20B are partial enlarged side views showing another configuration (part 2) of the magnet in the exemplary embodiment of the present invention.
Figure 20B:
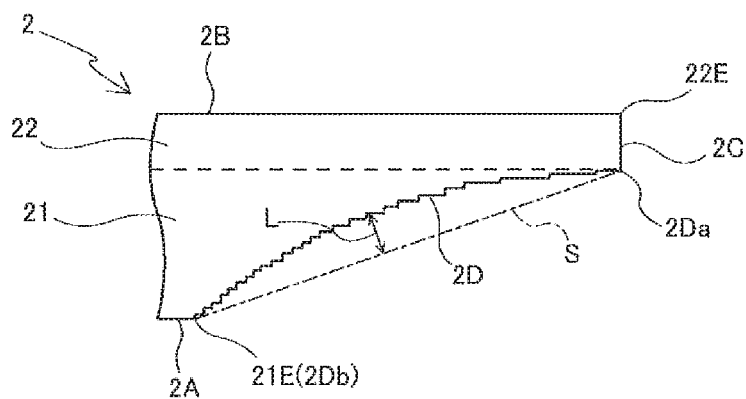

In the above-described exemplary embodiment, an explanation was given citing an example in which the curved inclined surface 2D of the magnet 2 has a curved surface, but the present invention is not limited to such a configuration. For example, it would be fine for the curved inclined surface 2D to be configured such that a plurality of planes are connected in a polygonal line, having a curved surface overall, as shown in FIG. 20A, and it would also be fine for this to be configured with minute steps, having a curved surface overall, as shown in FIG. 20B.

EMBODIMENTS

Below, the present invention is described in further detail by citing embodiments, but the present invention is not limited to any of the below-described embodiments.

Embodiment 1

Figure 21:
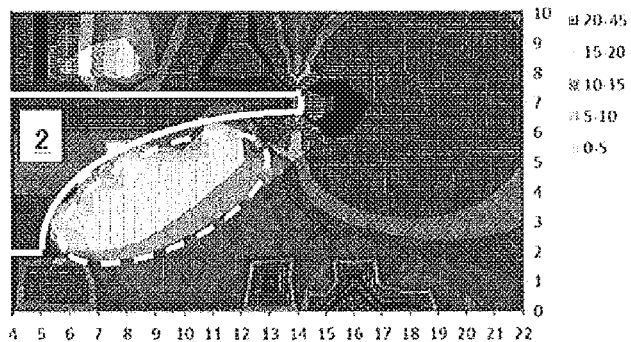
FIG. 21 is a diagram showing simulation results of a first embodiment.

In the rotating machine apparatus 10 having the configuration shown in FIG. 1A and FIG. 2, the magnetic field distribution of the magnet 2 and the angular error distribution based thereon were found through simulations using the finite element method (FEM). Suppose the thickness $T_{21}$ of the first magnetic section 21 of the magnet 2 to be 4.25 mm, the thickness $T_{22}$ of the second magnet section 22 to be 0.75 mm, the diameter $D_{2A}$ of the first surface 2A to be 10 mm, the diameter $D_{2B}$ of the second surface 2B to be 28 mm, the maximum distance L from the line segment S joining the end 2Da at the outermost position in the radial direction of the magnet 2 in the curve corresponding to the curved inclined surface 2D and the end 2Db in the innermost position in the radial direction (the outermost edge 21E of the first surface 2A) to the above-described curve (the curve corresponding to the curved inclined surface 2D) in a direction orthogonal to the line segment S to be 1.3 mm, the length $L_{28}$ between the shaft coupling 8 and the second surface 2B to be 8 mm, the length $L_{29}$ between the bearing 9 and the first surface 2A to be 2 mm, the material of the second shaft 7 and the shaft coupling 8 to be carbon steel for machine structural use S45C and the material of the bearing 9 to be cold-rolled steel product SPCC. The results are shown in FIG. 21.

Embodiment 2

Figure 11:
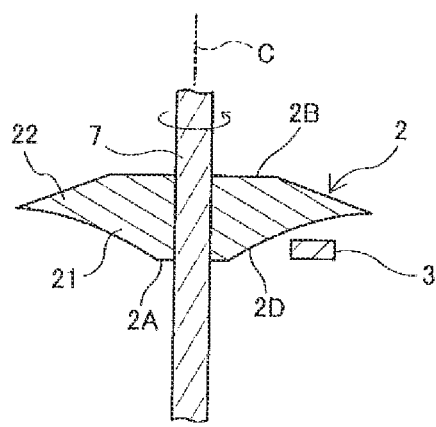
FIG. 11 is a cross sectional view showing another configuration (part 6) of the magnet in the exemplary embodiment of the present invention.
Figure 22:
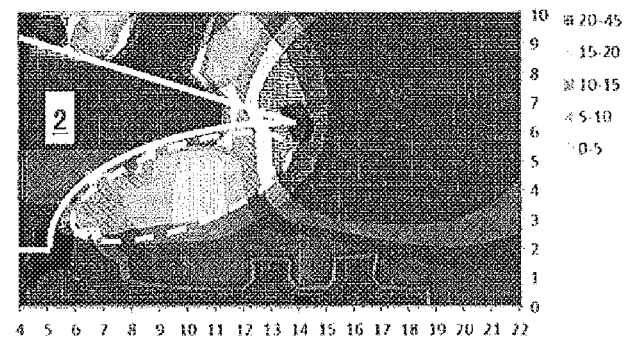
FIG. 22 is a diagram showing simulation results of a second embodiment.

Using a magnet 2 having the configuration shown in FIG. 11, and with the same configuration as in Embodiment 1 except that the thickness $T_{21}$ of the first magnet section 21 of the magnet 2 was taken to be 4.25 mm and the thickness $T_{22}$ of the second magnet section 22 was taken to be 3 mm, the magnetic field distribution of magnet 2 and the angular error distribution based thereon were found through simulation. The results are shown in FIG. 22.

Embodiment 3

Figure 23:
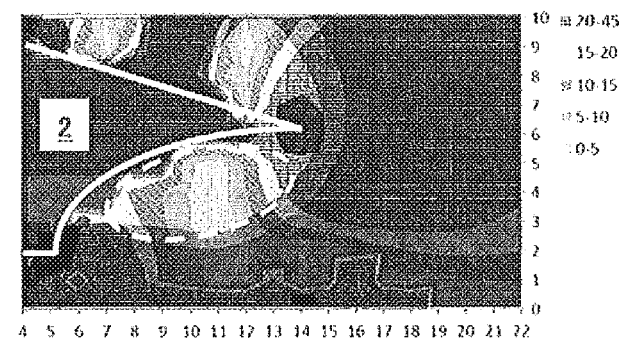
FIG. 23 is a diagram showing simulation results of a third embodiment.

Using the same configuration as in Embodiment 2 except that the maximum distance L from the line segment S joining the end 2Da at the outermost position in the radial direction of the magnet 2 in the curve corresponding to the curved inclined surface 2D and the end 2Db in the innermost position in the radial direction (the outermost edge 21E of the first surface 2A) to the above-described curve (the curve corresponding to the curved inclined surface 2D) in a direction orthogonal to the line segment S was taken to be 0.8 mm, the magnetic field distribution of magnet 2 and the angular error distribution based thereon were found through simulation. The results are shown in FIG. 23.

Embodiment 4

Figure 24:
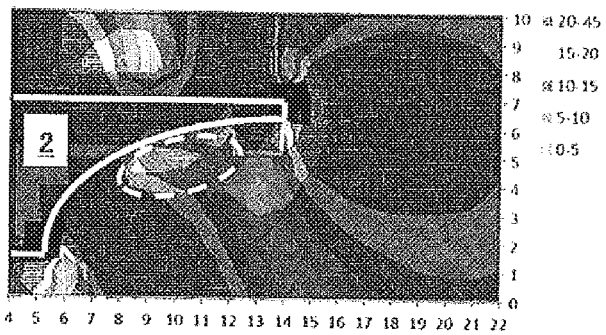
FIG. 24 is a diagram showing simulation results of a fourth embodiment.

Using the same configuration as in Embodiment 1 except that the configuration does not include the first shaft 6, the second shaft 7, the shaft coupling 8 or the bearing 9, the magnetic field distribution of magnet 2 and the angular error distribution based thereon were found through simulation. The results are shown in FIG. 24.

Embodiment 5

Figure 25:
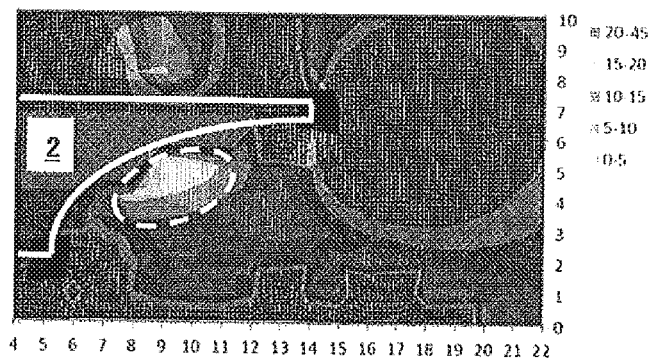
FIG. 25 is a diagram showing simulation results of a fifth embodiment.

Using the same configuration as in Embodiment 1 except that the configuration does not include the first shaft 6, the second shaft 7 or the shaft coupling 8, the magnetic field distribution of magnet 2 and the angular error distribution based thereon were found through simulation. The results are shown in FIG. 25.

Embodiment 6

Figure 26:
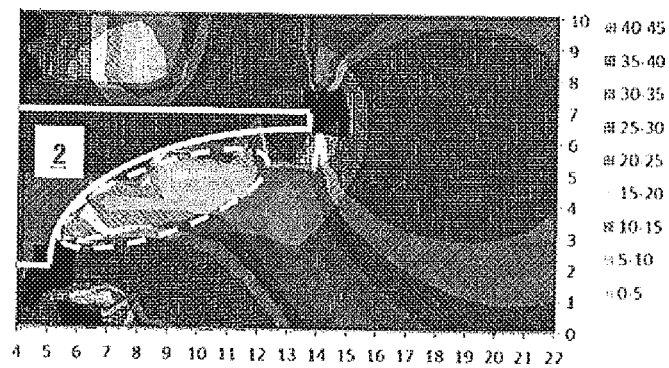
FIG. 26 is a diagram showing simulation results of a sixth embodiment.

Using the same configuration as in Embodiment 1 except that the configuration does not include the shaft coupling 8 or the bearing 9, the magnetic field distribution of magnet 2 and the angular error distribution based thereon were found through simulation. The results are shown in FIG. 26.

Embodiment 7

Figure 27:
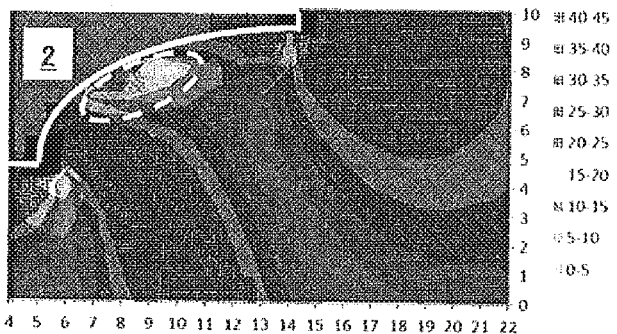
FIG. 27 is a diagram showing simulation results of a seventh embodiment.

Using the same configuration as in Embodiment 1 except that the configuration does not include the first shaft 6, the second shaft 7, or the bearing 9, the magnetic field distribution of magnet 2 and the angular error distribution based thereon were found through simulation. The results are shown in FIG. 27.

Embodiment 8

Figure 28:
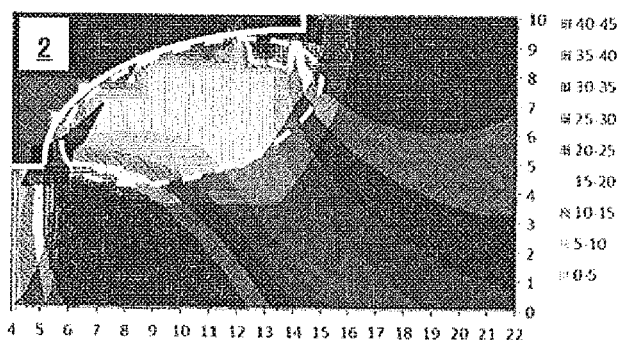
FIG. 28 is a diagram showing simulation results of an eighth embodiment.

Using the same configuration as in Embodiment 1 except that the configuration does not include the first shaft 6, the second shaft 7, the shaft coupling 8 or the bearing 9, and that a hole through which the second shaft 7 passes is not formed in the magnet 2, the magnetic field distribution of magnet 2 and the angular error distribution based thereon were found through simulation. The results are shown in FIG. 28.

Comparison Example 1

Figure 29:
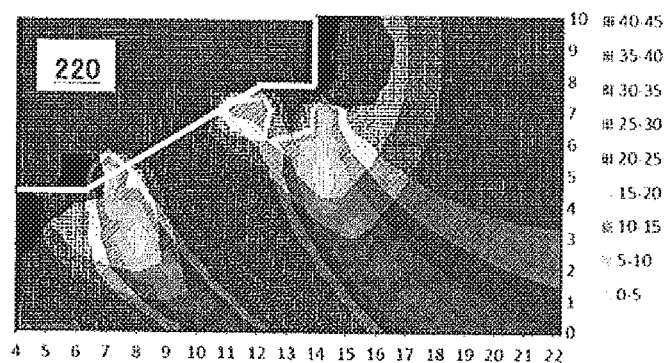
FIG. 29 is a diagram showing simulation results of a first comparison example.
Figure 34:
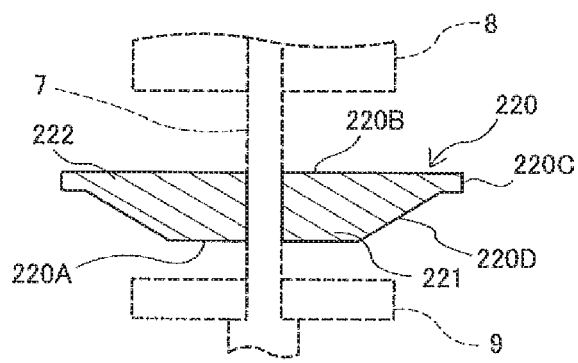
FIG. 34 is a cross sectional view showing a schematic configuration of the magnet in the first comparison example.

Using the same configuration as in Embodiment 1 except that a magnet 220 provided with a second magnet section 222, including a side surface 220C that connects to a second surface 220B and the outer perimeter edge thereof and is substantially parallel to the axis of rotation C of the shaft 7, and a first magnet section 221 that includes a first surface 220A, protrudes toward the first surface 221A side from a position closer to the inside in the radial direction than the side surface 220C of the second magnet section 222 and includes an inclined side surface 220D sloping at a prescribed angle to the inside in the radial direction, as shown in FIG. 34, was used, the magnetic field distribution of magnet 220 and the angular error distribution based thereon were found through simulation. In the magnet 220, the diameter of the first surface 220A was taken to be 12 mm, the diameter of the second surface 220B to be 28 mm, the thickness of the first magnet section 221 to be 2.25 mm, the thickness of the second magnetic section 222 to be 2.75 mm and the angle of inclination of the inclined surface 220D to be 25°. The results are shown in FIG. 29.

Comparison Example 2

Figure 30:
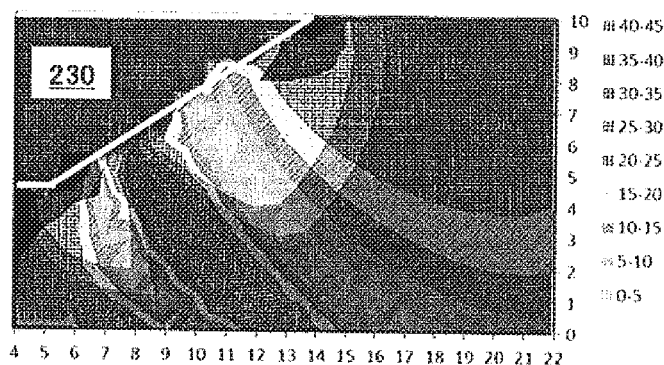
FIG. 30 is a diagram showing simulation results of a second comparison example.
Figure 35:
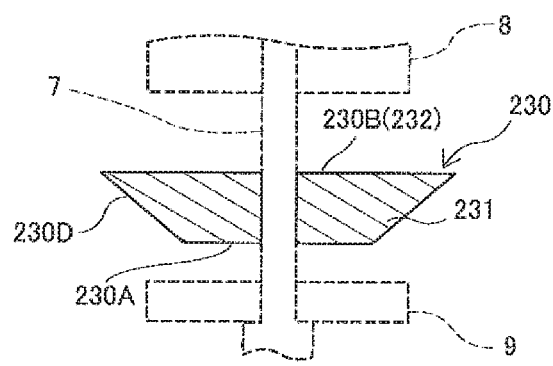
FIG. 35 is a cross sectional view showing a schematic configuration of the magnet in the second comparison example.

Using the same configuration as in Embodiment 1 except that a magnet 230 having a roughly trapezoidal cross section provided with a second magnet section 232, containing a second surface 230B, a first magnet section 231, containing a first surface 230A and an inclined side surface 230D connecting to the outer perimeter edge of the second surface 230B, as shown in FIG. 35, was used, the magnetic field distribution of magnet 230 and the angular error distribution based thereon were found through simulation. The thickness of the magnet 230 (the thickness of the first magnet section 231) was taken to be 5 mm, the diameter of the first surface 230A to be 12 mm, the diameter of the second surface 230B to be 28 mm and the angle of inclination of the inclined side surface 2D to be 32°. The results are shown in FIG. 30.

Comparison Example 3

Figure 31:
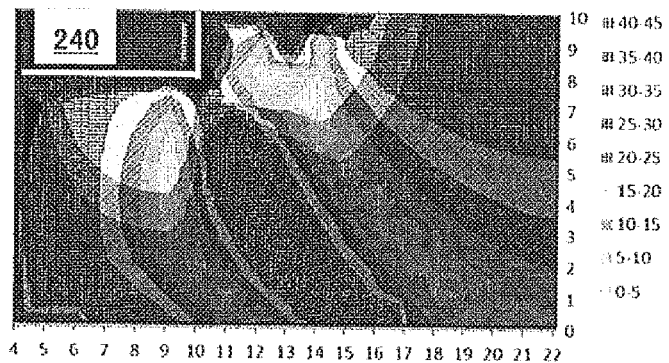
FIG. 31 is a diagram showing simulation results of a third comparison example.
Figure 36:
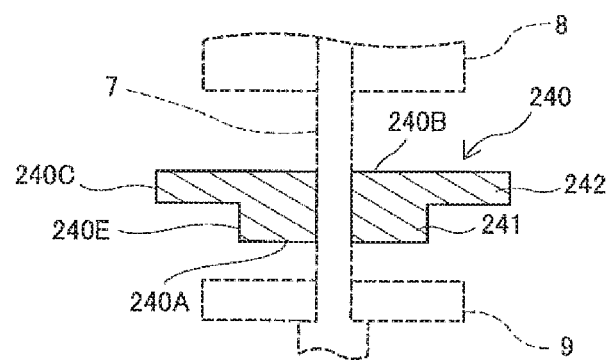
FIG. 36 is a cross sectional view showing a schematic configuration of the magnet in the third comparison example.

Using the same configuration as in Embodiment 1 except that a magnet 240 having a roughly step-shaped cross section provided with a second magnet section 242, containing a second surface 240B and a side surface 240C connecting to the outer perimeter edge of the second surface 240B, and a first magnet section 241, containing a first surface 240A and a side surface 240E rising in a direction substantially parallel to the axis of rotation of the shaft 7 from a position more inward in the radial direction than the side surface 240C, as shown in FIG. 36, was used, the magnetic field distribution of magnet 240 and the angular error distribution based thereon were found through simulation. The thicknesses of the first magnet section 241 and the second magnet section 242 of the magnet 240 were taken to each be 2.0 mm, the length in the radial direction from the rising position from the side surface 2C to be 4 mm, the diameter of the first surface 240A to be 20 mm and the diameter of the second surface 240B to be 28 mm. The results are shown in FIG. 31.

Comparison Example 4

Figure 32:
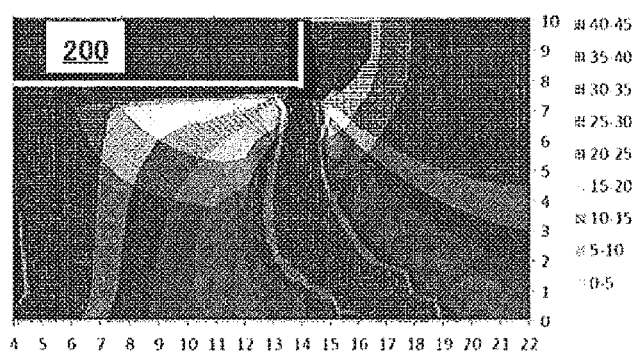
FIG. 32 is a diagram showing simulation results of a fourth comparison example.
Figure 37A:
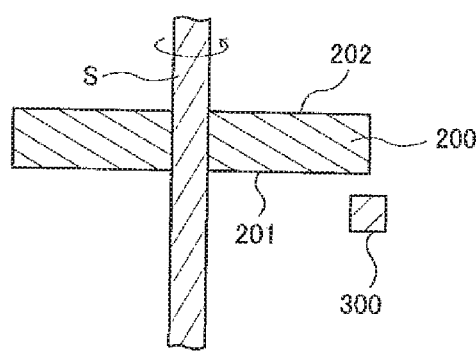
FIG. 37A is a cross sectional view showing a schematic configuration of a conventional rotational angle detection apparatus.
Figure 37B:
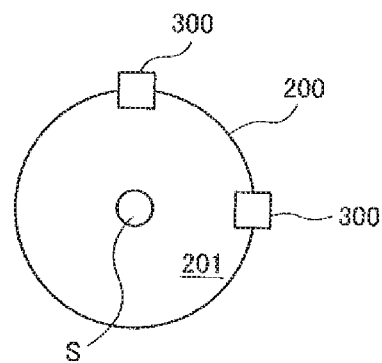
FIG. 37B is a planar view of the conventional rotational angle detection apparatus viewed from a first surface side of a magnet.

Using the same configuration as in Embodiment 1 except that a magnet 200 having a configuration shown in FIG. 37A and FIG. 37B was used, the magnetic field distribution of magnet 200 and the angular error distribution based thereon were found through simulation. The thickness of the magnet 200 was taken to be 3 mm and the diameter to be 28 mm. The results are shown in FIG. 32.

Comparison Example 5

Figure 33:
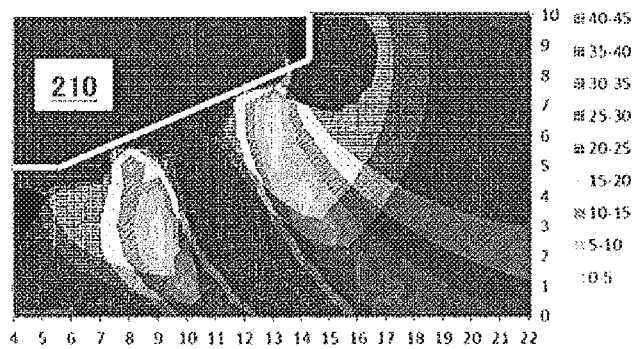
FIG. 33 is a diagram showing simulation results of a fifth comparison example.
Figure 38A:
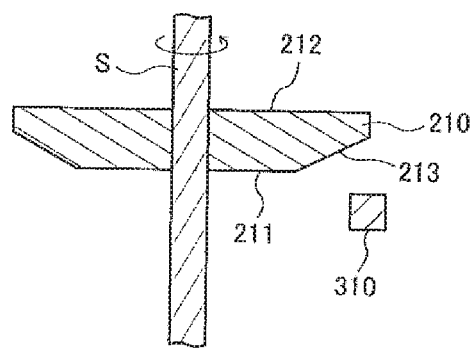
FIG. 38A is a cross sectional view showing a schematic configuration of a conventional rotational angle detection apparatus.
Figure 38B:
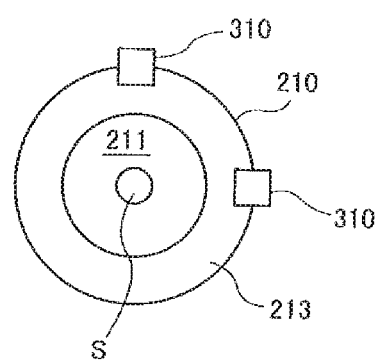
FIG. 38B is a planar view of the conventional rotational angle detection apparatus viewed from a first surface side of a magnet.

Using the same configuration as in Embodiment 1 except that a magnet 210 having a configuration shown in FIG. 38A and FIG. 38B was used, the magnetic field distribution of magnet 210 and the angular error distribution based thereon were found through simulation. The thickness of the magnet 210 was taken to be 5 mm, the diameter of a first surface 211 to be 14.0 mm, the diameter of a second surface 212 to be 28 mm and the angle of inclination of an inclined side surface 213 to be 30°. The results are shown in FIG. 33.

FIGS. 21~33 are diagrams showing the angular error distribution near the outer perimeter edge of the magnets 2 and 200~240, as found through simulations with Embodiments 1~8 and Comparison Examples 1~5. In FIGS. 21~33, regions of lowest brightness (dark gray regions) surrounding the magnets 2 and 200~240 are regions where the magnetic field intensities $H_r$ and $H_\theta$ in the radial direction and the circumferential direction are less than 15 mT, regions of highest brightness (bright regions) are regions where the magnetic field intensities $H_r$ and $H_\theta$ in the radial direction and the circumferential direction are at least 20 mT, and regions of brightness between these (light gray regions) are regions where the magnetic field intensities $H_r$ and $H_\theta$ in the radial direction and the circumferential direction are at least 15 mT and less than 20 mT. Regions enclosed by dotted lines are regions where angular errors are good, and are regions having magnetic field intensities (magnetic field intensities $H_r$, $H_\theta$=20~80 mT) detectable by the magnetic sensor 3, and thus are regions that are magnetic sensor placeable regions 5.

From the results shown in FIGS. 21-33, it became clear that in Embodiments 1-4, the rotational angle can be precisely detected on the basis of the magnetic field intensities $H_r$ and $H_\theta$ in the radial direction and/or the circumferential direction. In addition, from the results of Embodiments 1, and 5-7, it was confirmed that by having first and second shafts 6 and 7, a shaft coupling 8 and a bearing 9 composed of magnetic materials, the magnetic field intensities $H_r$ and $H_\theta$ are amplified, the angular detection precision is improved and the magnetic sensor placeable region 5 is enlarged. Furthermore, from the results of Embodiments 5 and 8, it was confirmed that in a magnet 2 in which a hole through which the second shaft 7 passes is not formed, the magnetic field intensities $H_r$ and $H_\theta$ are amplified, the angular detection precision is improved and the magnetic sensor placeable region 5 is enlarged. On the other hand, in the Comparison Examples 1-5, it was confirmed that the magnetic sensor placeable region 5 in Embodiments 1-8 was not formed below the magnet (on the bearing 9 side). From this, it became clear that in Embodiments 1-8, by ensuring that the magnet 2 has a curved inclined surface 2D, it is possible to precisely detect the angle of rotation below the curved inclined surface 2D.

EXPLANATION OF REFERENCE SYMBOLS

1 Rotational angle detection apparatus
2 Magnet
  2A First surface
  2B Second surface
  2D Curved inclined surface
3 Magnetic sensor
4 Rotational angle detector

What is claimed is:

1. A rotational angle detection apparatus comprising:
a magnet located to be rotatable integrally with an axis of rotation accompanying rotation of a rotating body, wherein the magnet has a circular shape when viewed along the axis of rotation, and wherein the magnet includes a magnetization vector component in a direction orthogonal to the axis of rotation;
a magnetic sensor that outputs a sensor signal based on change in a magnetic field accompanying rotation of the magnet; and
a rotational angle detector that detects a rotational angle of the rotating body based on the sensor signal output by the magnetic sensor, wherein
the magnet has a first magnet section and a second magnet section that is integrated with the first magnet section;
the first magnet section is positioned on a first axial end of the magnet;
the second magnet section is positioned a second axial end of the magnet, wherein the first axial end of the magnet is opposite to the second axial end of the magnet;
the first magnet section includes a first surface orthogonal to the axis of rotation and a curved inclined surface;
the second magnet section includes a second surface, which is orthogonal to the axis of rotation and is opposed to the first surface of the first magnet section;
the second magnet section further includes a side surface, which is connected with an outer perimeter of the second surface;
the side surface of the second magnet section is parallel to the axis of rotation;
the side surface of the second magnet section includes a first edge that is positioned on one side of the axial direction of the axis of rotation and a second edge that is positioned on the other side of the axial direction of the axis of rotation;
the curved inclined surface is connected with the outer perimeter of the first surface of the first magnet section and the second edge of the side surface of the second magnet section;
the curved inclined surface is sloped while curving in a concave shape toward the axis of rotation;
in a cross section of the magnet taken along the axis of rotation, the magnetic sensor is located in a region that is enclosed by a first virtual plane parallel to the axis of rotation and including the side surface of the second magnet section, a second virtual plane orthogonal to the axis of rotation and including the first surface of the first magnet section and the curved inclined surface of the first magnet section;
when a circular virtual plane, which is orthogonal to the axis of rotation and centered at the axis of rotation, passes through a position where the magnetic sensor is located, the magnetic sensor is located at a position at which the amplitudes of a magnetic field intensity $H_r$ in a radial direction and a magnetic field intensity $H_\theta$ in a circumferential direction on the circular virtual plane are the same; and
the magnetic sensor outputs at least one of the magnetic field intensity $H_r$ in the radial direction and the magnetic field intensity $H_\theta$ in the circumferential direction as the sensor signal.

2. The rotational angle detection apparatus of claim 1, wherein
in a cross section of the magnet along an axial direction of the axis of rotation, a maximum distance L from a line segment joining one end of an outermost position in the radial direction of a curve corresponding to the curved inclined surface and another end at an innermost position in a radial direction of a curve corresponding to the curved inclined surface in a direction orthogonal to the line segment is 0.5~4 mm.

3. The rotational angle detection apparatus of claim 1, wherein the diameter of the first magnet section increases from the first surface toward the second magnet section.

4. The rotational angle detection apparatus of claim 3, wherein the second surface of the second magnet section is circular in shape when viewed along the axial direction of the axis of rotation.

5. The rotational angle detection apparatus of claim 3, wherein the second magnet section has a convex section protruding from the second surface along the axial direction of the axis of rotation.

6. The rotational angle detection apparatus of claim 5, wherein the convex section protrudes more inward in a radial direction of the magnet than an outermost edge in the radial direction of the magnet.

7. The rotational angle detection apparatus of claim 5, wherein the convex section protrudes to slope inward in a radial direction of the magnet.

8. The rotational angle detection apparatus of claim 1, wherein the magnetic sensor contains a TMR element, a GMR element or an AMR element.

9. The rotational angle detection apparatus of claim 1, wherein the magnetic sensor is one of a plurality of magnetic sensors, and at least two of the magnetic sensors are positioned along the circumferential direction on the virtual plane, spaced at $(180/M)°$ (where M is an integer 2 or larger) centering on the axis of rotation.

10. The rotational angle detection apparatus of claim 9, wherein each of the magnetic sensors outputs the magnetic field intensity $H_r$ in the radial direction or the magnetic field intensity $H_\theta$ in the circumferential direction, as the sensor signal.

11. A rotating machine apparatus comprising:
the rotational angle detection apparatus disclosed in claim 1,
a shaft coupling that connects a first shaft and a second shaft connected to the rotating body to be able to integrally rotate, and a bearing that supports one end of the second shaft; wherein the magnet is positioned between the shaft coupling and the bearing, and is supported by and fixed to the second shaft while being penetrated by the second shaft; and
at least one of the second shaft, the shaft coupling and the bearing is composed of magnetic materials.

12. A rotating machine apparatus comprising:
a rotational angle detection apparatus; and
a shaft coupling, which connects a first shaft and a second shaft connected to the rotating body to be able to integrally rotate, and a bearing, which supports one end of the second shaft, wherein
the magnet is positioned between the shaft coupling and the bearing and is supported by and fixed to the second shaft while being penetrated by the second shaft;
at least one of the second shaft, the shaft coupling and the bearing is composed of magnetic materials;
the rotational angle detection apparatus comprises
a magnet located to be rotatable integrally with an axis of rotation accompanying rotation of a rotating body, wherein the magnet has a circular shape when viewed along the axis of rotation, and wherein the magnet includes a magnetization vector component in a direction orthogonal to the axis of rotation;
a magnetic sensor that outputs a sensor signal based on change in a magnetic field accompanying rotation of the magnet; and
a rotational angle detector that detects a rotational angle of the rotating body based on the sensor signal output by the magnetic sensor, wherein
the magnet has a curved inclined surface that is sloped while curving in a concave shape along the axis of rotation from a prescribed position on the outer side in a radial direction of the magnet toward the axis of rotation, and
when a circular virtual plane, which is orthogonal to the axis of rotation and centered at the axis of rotation, passes through a position opposed to the curved inclined surface, the magnetic sensor is located at a position opposed to the curved inclined surface and at a position at which the amplitudes of a magnetic field intensity $H_r$ in a radial direction and a magnetic field intensity $H_\theta$ in a circumferential direction on the virtual plane are the same, and at least one of the magnetic field intensity $H_r$ in the radial direction and the magnetic field intensity $H_\theta$ in the circumferential direction is output as the sensor signal.

* * * * *